United States Patent
Ohlsson et al.

(10) Patent No.: US 12,389,284 B2
(45) Date of Patent: Aug. 12, 2025

(54) RADIO NETWORK NODE, USER EQUIPMENT (UE) AND METHODS PERFORMED THEREIN

(71) Applicant: Telefonaktiebolaget LM Ericsson (publ), Stockholm (SE)

(72) Inventors: Oscar Ohlsson, Bromma (SE); Johan Rune, Lidingö (SE); Pontus Wallentin, Linköping (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 440 days.

(21) Appl. No.: 17/789,827

(22) PCT Filed: Feb. 12, 2021

(86) PCT No.: PCT/SE2021/050117
§ 371 (c)(1),
(2) Date: Jun. 29, 2022

(87) PCT Pub. No.: WO2021/162621
PCT Pub. Date: Aug. 19, 2021

(65) Prior Publication Data
US 2023/0053069 A1    Feb. 16, 2023

Related U.S. Application Data

(60) Provisional application No. 62/975,816, filed on Feb. 13, 2020.

(51) Int. Cl.
*H04W 36/00* (2009.01)
*H04L 47/34* (2022.01)
(Continued)

(52) U.S. Cl.
CPC ......... *H04W 36/0038* (2013.01); *H04L 47/34* (2013.01); *H04W 12/037* (2021.01);
(Continued)

(58) Field of Classification Search
CPC ......... H04W 36/0038; H04W 36/0005; H04W 36/185; H04W 36/0055; H04W 36/0235; H04W 12/037
See application file for complete search history.

(56) References Cited

U.S. PATENT DOCUMENTS

2018/0367288 A1    12/2018  Vrzic et al.
2019/0037635 A1*   1/2019   Guo ..................... H04W 76/27
(Continued)

FOREIGN PATENT DOCUMENTS

| CN | 101779493 A  | 7/2010  |
| CN | 108886722 A  | 11/2018 |
| JP | 2014042263 A | 3/2014  |

OTHER PUBLICATIONS

Author Unknown, "Technical Specification Group Radio Access Network; NR; Packet Data Convergence Protocol (PDCP) specification (Release 15)," Technical Specification 38.323, Version 15.6.0, Jun. 2019, 3GPP Organizational Partners, 26 pages.
(Continued)

*Primary Examiner* — Redentor Pasia
(74) *Attorney, Agent, or Firm* — Withrow & Terranova, PLLC

(57) ABSTRACT

Embodiments herein relate to for example a method performed by a radio network node for handling a communication of a user equipment, UE, in a wireless communication network. The radio network node transmits a handover command for handing over the UE, from a source cell to a target cell, wherein a security parameter for encrypting data communicated between the radio network node and the UE
(Continued)

is retained during the handover. Furthermore, the radio network node maintains a sequence number status for reception and/or transmission of a signalling radio bearer of the UE during the handover from the source cell to the target cell, and/or at a fallback from the target cell to the source cell, when the UE triggers the fallback to the source cell.

21 Claims, 21 Drawing Sheets

(51) Int. Cl.
  *H04W 12/037* (2021.01)
  *H04W 36/02* (2009.01)
  *H04W 36/18* (2009.01)
(52) U.S. Cl.
  CPC ... *H04W 36/0005* (2013.01); *H04W 36/0079* (2018.08); *H04W 36/185* (2023.05); *H04W 36/0055* (2013.01); *H04W 36/0235* (2023.05)

(56) References Cited

U.S. PATENT DOCUMENTS

| | | | |
|---|---|---|---|
| 2019/0159065 A1* | 5/2019 | Kim | H04L 47/34 |
| 2019/0223073 A1* | 7/2019 | Chen | H04W 36/0077 |
| 2019/0253945 A1* | 8/2019 | Paladugu | H04W 12/106 |
| 2020/0314714 A1* | 10/2020 | Jung | H04W 76/27 |
| 2021/0014764 A1* | 1/2021 | Zhang | H04W 76/30 |
| 2021/0092654 A1* | 3/2021 | Kadiri | H04W 36/00692 |
| 2021/0105681 A1* | 4/2021 | Paladugu | H04W 36/328 |
| 2021/0105688 A1* | 4/2021 | Paladugu | H04W 36/0016 |
| 2021/0136638 A1* | 5/2021 | Paladugu | H04W 76/27 |
| 2022/0232374 A1* | 7/2022 | Yoo | H04W 36/0038 |
| 2022/0408323 A1* | 12/2022 | Ishii | H04W 36/362 |

OTHER PUBLICATIONS

Author Unknown, "Technical Specification Group Radio Access Network; NR; NR and NG-RAN Overall Description; Stage 2 (Release 16)," Technical Specification 38.300, Version 16.0.0, Dec. 2019, 3GPP Organizational Partners, 101 pages.
Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.
Ericsson, "Tdoc R2-2000125: Open issues at fallback to source cell at DAPS handover," 3GPP TSG-RAN WG2 #109, Electronic Meeting, Feb. 24-Mar. 6, 2020, 8 pages.
Ericsson, "Tdoc R2-2000126: Daps handover without key change," 3GPP TSG-RAN WG2 #109, Electronic Meeting, Feb. 24-Mar. 6, 2020, 9 pages.
Huawei, et al., "R2-1915351: Draft CR for 38.323 on supporting DAPS handover," 3GPP TSG-RAN2 Meeting #108, Nov. 18-22, 2019, Reno, Nevada, 16 pages.
Huawei, et al., "R2-2001646: Running CR for 38.323 on supporting DAPS handover," 3GPP TSG-RAN2 Meeting #109-e, Electronic Meeting, Feb. 24-Mar. 6, 2020, 12 pages.
Intel, "R2-2000461: Report of [108#66][LTE NR Mob] Open issues for LTE and NR mobility," 3GPP TSG-RAN WG2 Meeting #109, Electronic Meeting, Feb. 24-Mar. 6, 2020, 100 pages.
Intel Corporation, "R2-2001271: Rrc running CR for introduction of NR mobility enhancement [108#34], " 3GPP TSG-RAN WG2 Meeting #109, Electronic Meeting, Feb. 24-Mar. 6, 2020, 522 pages.
LG Electronics Inc., "R2-2001506: Handling of DAPS HO failure," 3GPP TSG-RAN WG2 #109-e, Feb. 24-Mar. 6, 2020, Online, 4 pages.
MediaTek Inc., et al., "R2-1912966: Report of email discussion: [107#44][LTE and NR /feMOB] Discussion on PDCP details for RUDI HO," 3GPP TSG-RAN WG2 #107bis, Oct. 14-18, 2019, Chongqing, China, 40 pages.
OPPO, "R2-1915154: SRB handling for DAPS handover," 3GPP TSG-RAN WG2 Meeting #108, Nov. 18-22, 2019, Reno, Nevada, 4 pages.
International Search Report and Written Opinion for International Patent Application No. PCT/SE2021/050117, mailed May 7, 2021, 16 pages.
International Preliminary Report on Patentability for International Patent Application No. PCT/SE2021/050117, mailed May 23, 2022, 25 pages.
Huawei, et al., "R2-1915350: Draft CR for 36.323 on supporting DAPS handover," 3GPP TSG-RAN2 Meeting #108, Reno, Nevada, Nov. 18-22, 2019, 22 pages.
Intel Corporation, "R2-1914840: DAPS failure handling," 3GPP TSG RAN WG2 Meeting #108, Nov. 18-22, 2019, Reno, Nevada, 4 pages.
LG Electronics Inc., "R2-1915909: When to apply the target network configurations," 3GPP TSG-RAN WG2 Meeting #108, Nov. 18-22, 2019, Reno, Nevada, 2 pages.
NEC, "R2-1915351: Remaining issues on the PDCP anchor relocation for DPAS based handover," 3GPP TSG-RAN WG2 #108, Nov. 18-22, 2019, Reno, Nevada, 3 pages.
ZTE, "R2-1904255: Report of [105#57][LTE/feMOB] UE and network side impacts of single/dual protocol stacks," 3GPP TSG RAN WG2 Meeting #105bis, Apr. 8-12, 2019, Xi'an, China, 34 pages.
First Office Action for Chinese Patent Application No. 202180009601. 7, mailed Oct. 19, 2023, 10 pages.
Intention to Grant for European Patent Application No. 21707418.6, mailed Jun. 23, 2023, 8 pages.
Notice of Reasons for Refusal for Japanese Patent Application No. 2022-548527, mailed Oct. 19, 2023, 9 pages.

\* cited by examiner

RADIO NETWORK NODE, USER EQUIPMENT (UE) AND METHODS PERFORMED THEREIN

This application is a 35 U.S.C. § 371 national phase filing of International Application No. PCT/SE2021/050117, filed Feb. 12, 2021, which claims the benefit of provisional patent application Ser. No. 62/975,816, filed Feb. 13, 2020, the disclosures of which are incorporated herein by reference in their entireties.

TECHNICAL FIELD

Embodiments herein relate to a user equipment (UE), a radio network node and methods performed therein for communication. Furthermore, a computer program product and a computer readable storage medium are also provided herein. In particular, embodiments herein relate to communicating within a wireless communication network.

BACKGROUND

In a typical wireless communication network, User equipments (UE), also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify upcoming releases of a Fifth Generation (5G) network also known as new radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

The 5G system (5GS) defined by 3GPP Rel-15 introduces both a new radio access network (NG-RAN) and a new core network denoted as 5GC.

Similar to E-UTRAN, the NG-RAN uses a flat architecture and consists of base stations, called gNBs, which are interconnected with each other by means of the Xn-interface. The gNBs are also connected by means of the NG interface to the 5GC, more specifically to the Access and Mobility Function (AMF) by the NG-C interface and to the User Plane Function (UPF) by means of the NG-U interface. The gNB in turn supports one or more cells which provides the radio access to the UE. The radio access technology (called next radio, NR) is orthogonal frequency division multiplex (OFDM) based like in LTE and offers high data transfer speeds and low latency.

It is expected that NR will be rolled out gradually on top of the legacy LTE network starting in areas where high data traffic is expected. This means that NR coverage will be limited in the beginning and users must move between NR and LTE as they go in out of coverage. To support fast mobility between NR and LTE and avoid change of core network, LTE eNBs will also connect to the 5G-CN and support the Xn interface. An eNB connected to 5GC is called a next generation eNB (ng-eNB) and is considered part of the NG-RAN (see FIG. 1). LTE and ng-eNBs are described for completeness and will not be considered further in this document.

The logical architecture of the gNB may be split into a Central Unit (CU) and Distributed Unit (DU) which are connected through the F1 interface. The CU/DU split enables a centralized deployment (which in turn simplifies e.g. coordination between cells) without putting extreme demands on the front-haul transmission bandwidth and latency. The internal structure of the gNB is not visible to the core network and other RAN nodes, so the gNB-CU and connected gNB-DUs are only visible to other gNBs and the 5GC as a gNB.

Several different CU-DU split options were considered in 3GPP in the initial phase of the Rel-15 standardization. The NR protocol stack, which includes Physical (PHY) layer, medium access control (MAC) layer, radio link control (RLC) layer, Packet Data Convergence Protocol (PDCP) layer, and radio resource control (RRC) layer, was taken as a basis for this investigation and different split points across the protocol stack was investigated. After careful analysis, 3GPP agreed on a higher layer split where PDCP/RRC reside in the CU and RLC/MAC/PHY reside in the DU. This is shown in FIG. 2

5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network (5GC).

5G is designed to support new use cases requiring ultra-reliable low-latency communication (URLLC) such as factory automation and autonomous driving. To be able to meet the stringent requirements on reliability and latency also during mobility, two new handover types are introduced in 5G Release 16 called make-before-break handover and conditional handover. The make-before-break handover, also known as Dual Active Protocol Stack (DAPS) handover, is described in more detail below after a review of the NG-RAN architecture and the legacy handover procedure.

Release (Rel)-15 Handover

Mobility in connected state is also known as handover. The purpose of handover is to move the UE from a source node using a source radio connection (also known as source cell connection), to a target node, using a target radio connection (also known as target cell connection). The target radio connection is associated with a target cell controlled by the target access node. So in other words, during a handover, the UE moves from the source cell to a target cell. Sometimes the source access node or the source cell is referred to as the "source", and the target access node or the target cell is sometimes referred to as the "target". The source access node and the target access node may also be referred to as the source node and the target node, the source radio network node and the target radio network node or the source gNB and the target gNB.

In some cases, the source access node and target access node are different nodes, such as different gNBs. These cases are also referred to as inter-node or inter-gNB handover. In other cases, the source access node and target access node are the same node, such as the same gNB. These cases are also referred to as intra-node or intra-gNB handover and covers the case when the source and target cells are controlled by the same access node. In yet other cases, handover is performed within the same cell, e.g. for the purpose of refreshing the security keys, and thus also within the same access node controlling that cell. These cases are referred to as intra-cell handover.

It should therefore be understood that the source access node and target access node refer to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An inter-node handover can further be classified as an Xn-based or NG-based handover depending on whether the source and target node communicate directly using the Xn interface or indirectly via the core network using the NG interface.

FIG. 3 shows the signalling flow between the UE and source and target access node during an Xn-based inter-node handover in NR.

Note that control plane data (i.e. RRC messages such as the measurement report, handover command and handover complete messages) are transmitted on Signalling Radio Bearers (SRB) while the user plane data is transmitted on Data Radio Bearers (DRBs).

301-302. The UE and source gNB have an established connection and is exchanging user data. Due to some trigger, e.g. a measurement report from the UE, the source gNB decides to handover the UE to the target gNB.

303. The source gNB sends a HANDOVER REQUEST message to the target gNB with necessary information to prepare the handover at the target side. The information includes among other things the target cell id, the target security key, KgNB*, the current source configuration and the UE capabilities. In case of an intra-gNB handover, it is optional to derive a new security key for the target node when the UE is handed over to the target cell.

304. The target gNB prepares the handover and responds with a HANDOVER REQUEST ACKNOWLEDGE message to the source gNB, which includes the handover command (a RRCReconfiguration message containing the reconfigurationWithSync field) to be sent to the UE. The handover command includes information needed by the UE to access the target cell, e.g., random access configuration, a new C-RNTI assigned by the target access node and security parameters enabling the UE to calculate the target security key so the UE can send the handover complete message (a RRCReconfigurationComplete message). In case of an intra-gNB handover, if a new security key is not derived for the target node, the security parameters are omitted in the handover command.

305. The source gNB triggers the handovers by sending the handover command received from the target node in the previous step to the UE.

306. Upon reception of the handover command the UE starts timer T304, releases the connection to the old cell before synchronizing and connecting to the new cell.

307-309. The source gNB stops scheduling any further DL or UL data to the UE and sends a SN STATUS TRANSFER message to the target gNB indicating the latest PDCP SN transmitter and receiver status. The source node now also starts to forward DL User Data to the target node, which buffers this data for now.

310. Once the UE the has completed the random access to the target cell, the UE sends the handover complete message to the target gNB.

311. Upon receiving the handover complete message, the target node can start exchanging user data with the UE. The target node also requests the AMF to switch the DL data path from the UPF from the source node to the target node (not shown). Once the path switch is completed the target node sends the UE CONTEXT RELEASE message to the source node.

Release 16 Make-Before-Break Handover (aka DAPS Handover) in NR

Handovers in NR can be classified as break-before-make handover since the connection to the source cell is released before the connection to the target cell is established. Handovers in NR therefore involve a short interruption of a few tens of ms where no data can be exchanged between the UE and the network.

To shorten the interruption time during handover a new type of handover, known as Dual Active Protocol Stack (DAPS) handover, is being introduced for NR and LTE in 3GPP Release 16. In DAPS handover the UE maintains the connection to the source cell while the connection to the target is being established. Thus, the DAPS handover can be classified as make-before-break handover. DAPS handover reduces the handover interruption but comes at the cost of increased UE complexity as the UE needs to be able to simultaneously receive/transmit from/to two cells at the same time.

The DAPS handover procedure in NR is illustrated in FIG. 4

401-402. Same as steps 301-302 in the legacy handover in FIG. 3.

403-404. Similar to steps 303-304 in the legacy handover procedure except that the source node indicates that the handover is a DAPS handover.

405. The source gNB triggers the handovers by sending the handover command (a RRCReconfiguration message containing the reconfigurationWithSync field) received from the target node in the previous step to the UE. The handover command includes an indication to perform a DAPS handover.

Note that DAPS handover is configured separately for each DRB in the handover command, i.e. it is possible to apply DAPS handovers for some DRBs but not for others. A DRB is referred to as a DAPS and non-DAPS DRB depending on if DAPS is applied for the DRB or not.

406. Upon reception of the handover command with indication of a DAPS handover, the UE starts timer T304 and starts synchronizing to the target cell. Unlike in normal handover, the UE keeps the connection in the source cell and continues to exchange UL/DL data with the source gNB for the DAPS DRBs even after it has received the handover command. Also, the source SRB1 is kept in the UE but in a suspended state. In order to decrypt/encrypt DL/UL data, the UE needs to maintain both the source and target security keys until the source cell is released. The UE can differentiate the security key to be used based on the cell which the DL/UL packet is received/transmitted on. If header compression is used the UE also needs to maintain two separate RObust Header Compression (ROHC) contexts for the source and target cell.

407-409. The source node sends an initial SN STATUS TRANSFER message to the target node containing the COUNT value of the first DL data forwarded to the target node and begins to forward DL data to the target gNB. Note that data that is forwarded may also be sent to the UE in the source cell, i.e. DL data may be duplicated. The target node buffers the DL data until the UE has connected with the target cell.

Note that the Xn message for conveying the DL and (possibly) UL receiver status for early data transfer in the DAPS handover is not yet decided in 3GPP. One could either re-use the existing SN STATUS TRANSFER message (as indicated in the figure) or one could define a new message called e.g. EARLY FORWARDING TRANSFER.

410. Once the UE the has completed the random access to the target cell, the UE sends the handover complete (a RRCReconfigurationComplete message) to the target gNB. After this point the UE receives DL data from both source and target cell while UL data transmission is switched to the target cell.

411. The target gNB sends a HANDOVER SUCCESS message to the source gNB indicating the UE has successfully established the target connection.

412. Upon reception of the HANDOVER SUCCESS message, the source gNB stops scheduling any further DL or UL data to the UE and sends a final SN STATUS TRANSFER message to target gNB indicating the latest PDCP SN and HFN transmitter and receiver status.

413-415. The target gNB instructs the UE to release the source connection by sending an RRCReconfiguration message with "release source" indication. The UE releases the source connection and responds with a RRCReconfigurationComplete message. From this point on, DL and UL data is only received and transmitted in the target cell.

416. Same as step 311 in the legacy handover procedure.

Note that, like in normal handover, the handover command (i.e. a RRCReconfiguration message containing the reconfigurationWithSync field) that is sent to the UE to trigger the handover procedure is generated by the target node (handling the target cell) but transmitted to the UE by the source node (in the source cell, i.e. the cell where the UE currently has its connection). In case of an inter-node handover, the handover command is sent from the target node to the source node within the Xn HANDOVER REQUEST ACKNOWLEDGE message as a transparent container, meaning that the source node does not change the contents of the handover command.

In order to not exceed the UE capabilities during a DAPS handover where the UE is simultaneously connected to both the source node (in the source cell) and the target node (in the target cell) the source node may need to reconfigure (also known as "downgrade") the UE's source cell configuration before triggering the DAPS handover. This reconfiguration can be done by performing an RRC connection reconfiguration procedure before the DAPS handover command is sent to the UE, i.e. before step 405. Alternatively, the updated (downgraded) source cell configuration can be sent together with the handover command, i.e., in the same RRC message and applied by the UE before the handover is executed. This can possibly speed up the DAPS handover (e.g. reduced processing time, as there is a single RRC message providing both source cell configuration downgrading and handover command).

FIG. 5 shows shows the protocol stack for the DAPS DRBs at the UE side during DAPS handover. Each DAPS DRB has an associated PDCP entity which in turn has two associated RLC entities—one for the source cell and one for the target cell. The PDCP entity uses different security keys and header compression contexts for the source and target cell while the SN allocation (for UL transmission) and re-ordering/duplication detection (for DL reception) is common. In case of an intra-gNB handover, if a new security key is not derived for the target node, the PDCP entity uses the source security key for both the source and target cell.

For SRBs and a non-DAPS DRBs data is only received/transmitted in a single cell at a time and hence the PDCP entity only has a single associated RLC entity and a single security key and header compression context (header compression is only used for DRBs). The security key and header compression context is updated when the SRB/non-DAPS DRB is switched from the source to the target. If the security key is retained during the handover, the PDCP entity uses the source security key also in the target cell.

Note that the key used for encryption/decryption is not the node key $K_{gNB}$ itself but rather a key derived from this key. The node specific $K_{gNB}$ serves as a so called master key from which further keys are derived. User plane data (i.e. DRB traffic) is encrypted/decrypted with the derived key $K_{UPenc}$ and control plane data (i.e. SRB traffic) is encrypted with $K_{RRCenc}$. The PDCP entity may therefore store the key $K_{UPenc}/K_{RRCenc}$ rather than the key $K_{gNB}$. In the remainder of this text we will not distinguish between $K_{gNB}$ and $K_{UPenc}/K_{RRCenc}$.

In regular handover the UE triggers RRC connection re-establishment if it fails to establish the connection to the target cell before expiry of timer T304. In DAPS handover, however, the source connection may still be available when the target connection fails. Hence, instead of triggering RRC connection re-establishment which causes interruption the UE can fall back to the source connection and report the handover failure to the source node. The fallback procedure is illustrated in FIG. 6.

601-609. Same as steps 401-409 in the DAPS handover in FIG. 4.

610. The UE fails to perform random access to the target cell.

611-612. The failed random access attempt causes the UE to trigger the fallback procedure towards the source node provided the source connection is still available (i.e. radio link failure has not been declared for the source connection). When fallback is triggered, the UE resumes SRB1 for the source connection (which was previously suspended when the DAPS handover was initiated) and indicates to the source node that the DAPS handover failed via the failure information message. The source node can then take appropriate action, e.g. trigger a new handover.

SUMMARY

In NR, it is optional for the network to update the security key for intra-gNB handovers, i.e. handovers where the source and target cell belong to the same gNB. This includes the case where the source and target cell are hosted by different gNB-DUs which belong to the same gNB-CU. If the source and target key are the same, this case is defined as "key retention". If key retention is also allowed for DAPS handover this may result in so called keystream reuse for the SRB1 transmissions in the source and target cell.

Keystream reuse is a general problem for stream ciphers (such as those used in NR) and can lead to the exposure of confidential data. This is because in stream ciphers, the incoming plaintext is XORed with the cipher's keystream to produce the corresponding ciphertext (see FIG. 7). The keystream is generated based on a secret key and an initialization vector (IV), where the latter is determined by the PDCP COUNT value, the bearer identity BEARER, and the transmission direction DIRECTION. If two ciphertexts are encrypted with the same key and IV, XORing these together will eliminate the keystream entirely, leaving the XOR of the original plaintexts.

As part of developing embodiments herein it was detected that keystream reuse can occur for SRB1 if the key is retained during a DAPS handover and the UE triggers fallback to the source cell, as illustrated in FIG. 8. This is because SRB1 uses different PDCP entities for the source and target cell and there is no coordination of the DL/UL COUNT between the PDCP entities. In action 801, the source node triggers DAPS handover. In action 802, the UE receives the handover command to perform a DAPS handover to a target cell controlled by the target gNB (note that since key retention is only allowed for intra-gNB handover the source and target gNB are in fact the same node). Based on the content of the handover command message (e.g. absence of the RRC information element masterKeyUpdate in NR), the UE retains the security key for the target cell. As an example of how keystream reuse may occur, assume that the PDCP entity for the target SRB1 is instantiated with TX_NEXT=n+1, where n is the COUNT value used for the last transmission on the source SRB1. The handover complete message in action 803 will then be transmitted on the target SRB1 with COUNT=n+1. Now if random access towards the target cell fails and thus timer T304 expires (handover failure) the UE will resume the SRB1 in the source cell, i.e. UE triggers fallback to source node if source connection is still available action 804, and will transmit the failure information message in action 805 on the source SRB1 also with COUNT=n+1. As a result, both the handover complete message and the failure information message will be encrypted with the same key and IV and hence there is keystream reuse. This means that an attacker that eavesdrops on the encrypted traffic sent over the radio interface can obtain information about the contents of the handover complete and failure information message by taking the XOR of the encrypted versions of these two messages. If the PDCP entity for the target SRB1 is instantiated with some other value for TX_NEXT (e.g. TX_NEXT=0) keystream reuse may also occur since the COUNT used for the handover complete message may collide with another previous or, if fallback is triggered, future RRC message sent on SRB1 in the source cell. Thus, this may lead to a reduced or limited performance of the wireless communication network.

An object of embodiments herein is to provide a mechanism for improving performance of the wireless communication network in an efficient manner.

According to an aspect the object may be achieved by a method performed by a radio network node for handling a communication of a user equipment, UE, in a wireless communication network. The radio network node transmits a handover command for handing over the UE in a make before break handover, from a source cell to a target cell, wherein a security parameter, e.g. a security key used for encrypting data communicated between the radio network node and the UE, is retained during the handover. The radio network node maintains a sequence number status, e.g. continuing sequentially adding a count number of a counter, for reception and/or transmission of a signalling radio bearer of the UE during the handover from the source cell to the target cell, and/or the radio network node maintains the sequence number status, for reception and/or transmission of the signalling radio bearer of the UE at a fallback from the target cell to the source cell, when the UE triggers the fallback to the source cell, e.g. in case of a random access failure in the target cell.

Thus, the radio network node may maintain sequential incrementation of a count value of a counter in the radio network node for the UE for reception and transmission of a signalling radio bearer of the UE, e.g. maintaining incrementing a PDCP DL/UL COUNT value for SRB1, at a handover to a target cell and at fallback to a source cell of the UE.

For the radio network node the method may comprise one or more of the following:
  transmits a handover command to the UE which instructs the UE to perform a DAPS handover from a source cell to a target cell and wherein the security key is retained during the handover;
  maintains the sequence number status for a signalling radio bearer during the handover of the UE from the source cell to the target cell;
  the radio network node may then receive a handover complete message from the UE on the signalling radio bearer in the target cell using sequence number n+1, where n is the sequence number of the last packet received on the signalling radio bearer in the source cell;
  in case the random access in the target cell fails and the UE triggers fallback to the source cell, the radio network node may maintain the counter value such as the packet sequence number status for the signalling radio bearer during the fallback of the UE from the target cell to the source cell; and the radio network node may receive a fallback indication message (such as failure information) on the signalling radio bearer in the source cell using packet sequence number n+2 or n+1 depending on if the handover complete message was transmitted by the UE in the source cell when the fallback was triggered.

According to another aspect the object may be achieved by a method performed by a UE for handling communication of the UE in a wireless communication network. The UE receives a handover command for handing over the UE in a make before break handover, from a source cell to a target cell, wherein a security parameter, e.g. a security key, used for encrypting data communicated between the radio network node and the UE, is retained during the handover. The UE maintains a sequence number status, e.g. adding sequentially a count number of a counter to a packet, for reception and/or transmission of a signalling radio bearer of the UE during the handover from the source cell to the target cell, and/or the UE maintains the sequence number status, for reception and/or transmission of the signalling radio bearer of the UE at a fallback from the target cell to the source cell, when the UE triggers the fallback to the source cell, e.g. in case of a random access failure in the target cell.

The UE may perform one or more of the following:

receives a handover command from a radio network node wherein the UE is instructed to perform a DAPS handover from a source cell to a target cell and wherein the security key is retained during the handover;

maintains the sequence number status for a signalling radio bearer during the handover from the source cell to the target cell;

may transmit a handover complete message to the radio network node on the signalling radio bearer in the target cell using sequence number n+1, where n is the sequence number of the last packet transmitted on the signalling radio bearer in the source cell;

in case fallback to the source cell is triggered due to handover failure in the target cell, maintaining the packet sequence number status for the signalling radio bearer during the fallback from the target cell to the source cell; and may transmit a fallback indication message (such as failure information) on the signalling radio bearer in the source cell using packet sequence number n+2 or n+1 depending on if the handover complete message was transmitted in the target cell when the fallback was triggered.

According to yet another aspect the object may be achieved by providing a radio network node and a UE configured to perform the methods herein.

Thus, according to still another aspect the object may be achieved by providing a radio network node for handling a communication of a UE in a wireless communication network. The radio network node is configured to transmit a handover command for handing over the UE in a make before break handover, from a source cell to a target cell, wherein a security parameter for encrypting data communicated between the radio network node and the UE is retained during the handover. The radio network node is further configured to maintain a sequence number status, continuing sequentially number packets, for reception and/or transmission of a signalling radio bearer of the UE during the handover from the source cell to the target cell, and/or at a fallback from the target cell to the source cell, when the UE triggers the fallback to the source cell.

Thus, according to yet still another aspect the object may be achieved by providing a UE for handling communication of the UE in a wireless communication network. The UE is configured to receive a handover command for handing over the UE in a make before break handover, from a source cell to a target cell, wherein a security parameter used for encrypting data communicated between the radio network node and the UE, is retained during the handover. The UE is further configured to maintain a sequence number status for reception and/or transmission of a signalling radio bearer of the UE during the handover from the source cell to the target cell, and/or at a fallback from the target cell to the source cell, when the UE triggers the fallback to the source cell.

It is furthermore provided herein a computer program product comprising instructions, which, when executed on at least one processor, cause the at least one processor to carry out any of the methods above, as performed by the UE or the radio network node, respectively. It is additionally provided herein a computer-readable storage medium, having stored thereon a computer program product comprising instructions which, when executed on at least one processor, cause the at least one processor to carry out the method according to any of the methods above, as performed by the UE or the radio network node, respectively.

To prevent keystream reuse during make before break handover, such as a DAPS handover, with key retention the sequential incrementation of the DL/UL COUNT value is maintained for SRB1 at handover to the target node and at fallback to the source node.

Embodiments herein allow the security indication or parameter such as a security key to be retained during HO without risking a problem such as a keystream reuse. Retaining the security parameter improves performance and reduces UE and network processing since retransmitted/duplicated packets do not need to be re-encrypted. To prevent keystream reuse for SRB1 when the key is retained during a DAPS handover, a count value for reception or transmission e.g. the PDCP DL/UL COUNT value is maintained for SRB1 at handover to the target cell and at fallback to the source cell. That is, the DL/UL COUNT value for SRB1 is sequentially incremented for every reception/transmission, irrespective of the cell (source or target cell) in which the reception/transmission occurs.

Embodiments herein thus enable the radio network node to fetch the capability information in an efficient and secure manner leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 9:
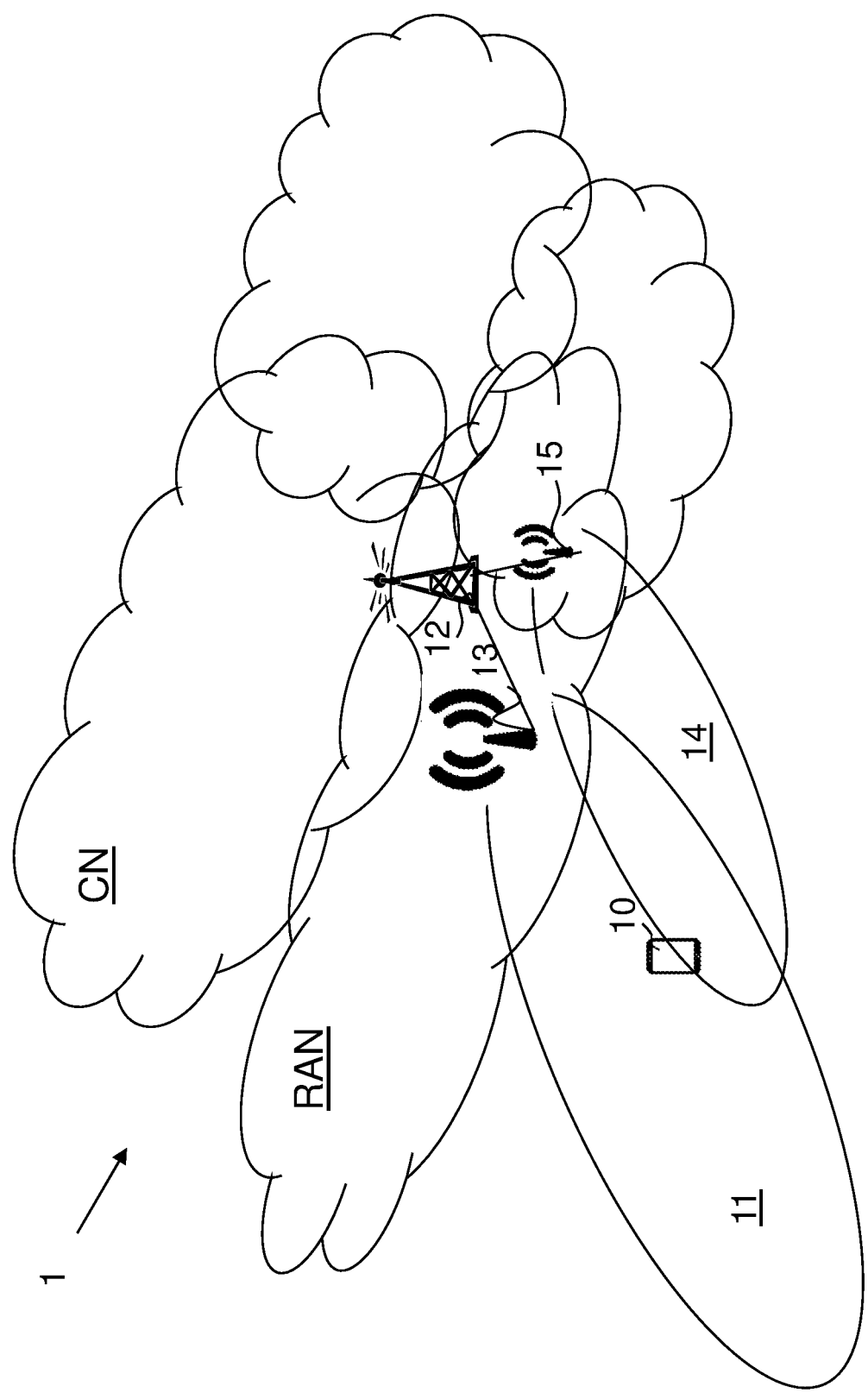
FIG. 9 shows a wireless communication network according to embodiments herein.

Embodiments herein relate to communication networks in general. FIG. 9 is a schematic overview depicting a wireless communication network 1. The wireless communication network 1 comprises one or more RANs e.g. a first RAN (RAN1), connected to one or more CNs. The wireless communication network 1 may use one or a number of different RA technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, UEs, e.g. a UE 10, such as a mobile station, a non-access point (non-AP) STA, a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things operable device, Device to Device (D2D) terminal, mobile device e.g. smart phone, laptop, mobile phone, sensor, relay, mobile tablets or any device communicating within a cell or service area.

The wireless communication network 1 comprises a radio network node 12 providing radio coverage over a geographical area, a first service area or a first cell 11, of a first radio access technology (RAT), such as New Radio (NR), LTE, UMTS, Wi-Fi or similar. The first cell may be provided by a first transmission and reception point (TRP) 13. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the first service area served by the radio network node 12 depending e.g. on the first radio access technology and terminology used. The first radio network node 12 may be referred to as source radio network node serving a source cell or similar.

The radio network node 12 or an additional radio network node may further provide radio coverage over a geographical area, a second service area or a second cell 14, of a second radio access technology (RAT), such as New Radio (NR), LTE, UMTS, Wi-Fi or similar. The second cell may be provided by a second transmission and reception point (TRP) 15. The first cell 11 may be referred to as a source cell 11 or similar and the second cell 14 may be referred to as target cell 14. The radio network node 12 may be a distributed node comprising a central unit and distributed units. The cells may be provided by one and same radio network node or provided from separated radio network nodes.

Embodiments herein allow the security parameter such as a security key to be retained during a make before break HO, e.g. DAPS handover, from e.g. the first cell 11 to the second cell 14 without risking a problem such as a keystream reuse. Retaining the security parameter and keeping the same compression process in both cells improves performance and reduces processing at the UE 10 and radio network node 12 since retransmitted/duplicated packets do not need to be re-encrypted.

To prevent keystream reuse for SRB1 when the key is retained during a DAPS handover, a count value of a counter in the radio network node, or UE, for the UE for reception and transmission of a signalling radio bearer of the UE 10, e.g. a PDCP DL/UL COUNT value for SRB1, is maintained at handover to the target cell and at fallback to the source cell. That is, the DL/UL COUNT value for SRB1 is sequentially incremented for every reception/transmission, irrespective of the cell (source or target cell) in which the reception/transmission occurs.

Figure 10:
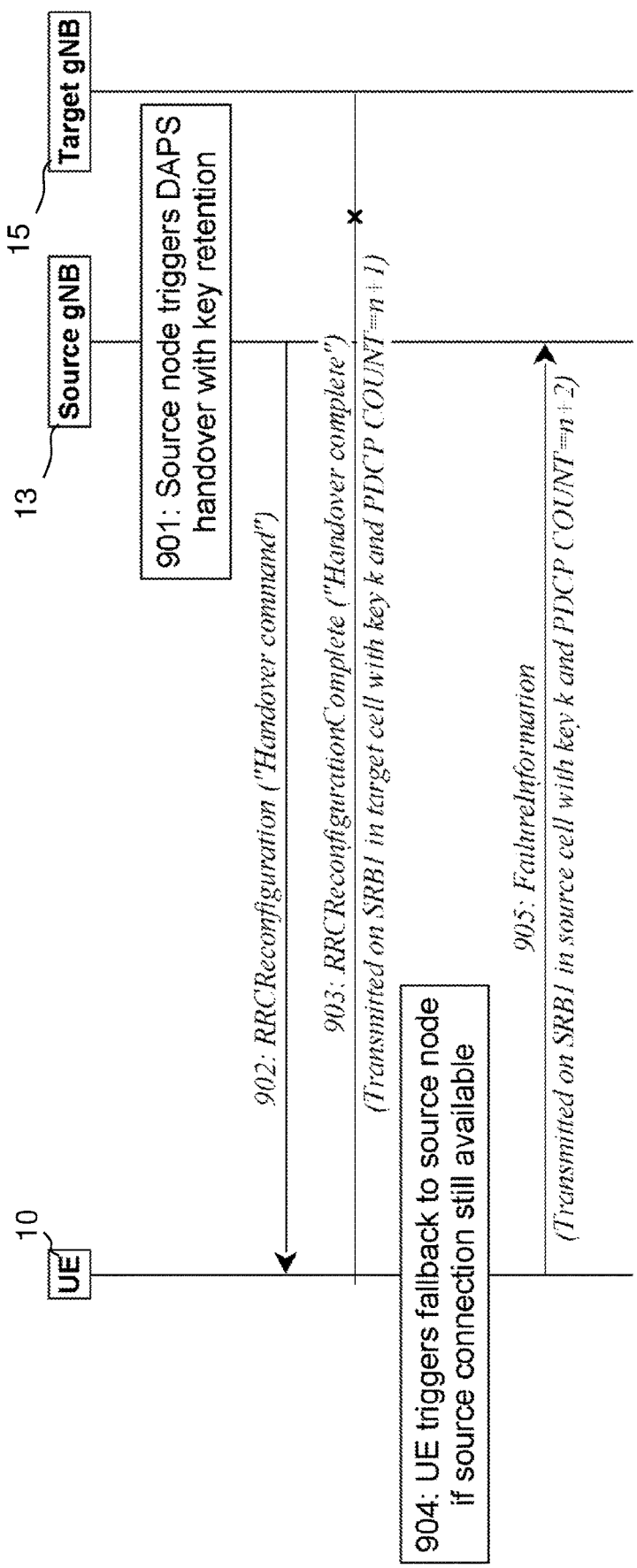
FIG. 10 shows a combined signalling scheme and flow chart according to embodiments herein.

The signalling diagram for an intra-gNB DAPS handover with key retention and with fallback to the source cell is illustrated in FIG. 10. Note that since key retention is only allowed for intra-gNB handover the source and target gNB in FIG. 10 are in fact the same node.

Action 901, the source gNB triggers a DAPS handover with security key retention. Upon receiving the DAPS handover command (i.e. an RRCReconfiguration message) in action 902, the UE 10 performs random access towards the target cell and as part of the random access procedure the UE transmits the handover complete message (i.e. an RRCReconfigurationComplete message) on SRB1 to the target node, action 903. Since the handover is performed with key retention (e.g. due to absence of the RRC information element masterKeyUpdate in NR), the UE 10 maintains the DL/UL COUNT values for SRB1, i.e. if the last PDCP PDU on SRB1 in the source cell was received/transmitted with COUNT=n, the first PDCP PDU on SRB1 in the target cell will be received/transmitted with COUNT=n+1. The DL/UL COUNT is also maintained in case the handover fails (e.g. timer T304 expiry) and the UE triggers fallback to the source cell in action 904, i.e. if the last PDCP PDU on SRB1 in the target cell was received/transmitted with COUNT=n+1, the first PDCP PDU on SRB1 in the source cell after the fallback will be received/transmitted with COUNT=n+2, action 905.

In particular, this means that if the last RRC message transmitted on SRB1 in the source cell was transmitted with COUNT=n the handover complete message in action 903 will be transmitted with COUNT=n+1 in the target cell. And if the random access procedure towards the target node in the target cell fails and fallback to the source cell is triggered, the fallback indication (such as the failure information message) will be transmitted on SRB1 in the source cell in action 905 with COUNT=n+2. Note that if no PDCP PDU was transmitted/received on SRB1 in the target cell when fallback to the source cell is triggered, the DL/UL COUNT continues from the value it had when the handover was initiated, i.e., if the last PDCP PDU on SRB1 in the source cell before the handover initiation was received/transmitted with COUNT=n, the first PDCP PDU on SRB1 in the source cell after the fallback to the source cell will be received/transmitted with COUNT=n+1.

Since the sequential incrementing of the DL/UL COUNT is maintained for SRB1 at DAPS handover and fallback to the source cell and the DL/UL COUNT is incremented for every PDCP PDU received/transmitted in the source cell or target cell, the same COUNT value will never be re-used for a PDCP PDU transmitted on SRB1. Hence each PDCP PDU will also be encrypted with a different initialization vector (IV) which ensures there is no keystream reuse.

To maintain the sequential incrementation of the DL/UL COUNT value for SRB1 one option is to use a common PDCP entity in the UE 10 for SRB1 in the source cell and the target cell and not re-setting the COUNT value at DAPS handover and at fallback to the source cell. Another option is to use separate PDCP entities in the UE 10 for SRB1 in the source cell and target cell and copy the latest DL/UL COUNT value between the PDCP entities at DAPS handover and at fallback to the source cell. It is also possible to maintain the COUNT value for only one of the directions, e.g. for the UL but not for the DL.

Although the above discussion focuses on SRB1, the same keystream reuse problem may also apply to SRB2 and non-DAPS DRBs if data can be transmitted/received on the radio bearer in the target cell before fallback to the source cell is triggered. As the DAPS handover procedure is defined today, however, it is only SRB1 that is used before fallback is triggered; SRB2 and the non-DAPS DRBs are only used in the target cell after the random access procedure is completed and since the target connection is considered established at this point the UE 10 will not trigger fallback to the source cell. If transmissions on SRB2 or the non-DAPS DRBs were to be allowed (e.g. in a future 3GPP release), the same solution of maintaining the sequence number status i.e. the sequential incrementation of the DL/UL COUNT value can be used also for these radio bearers. It is also possible that the sequential incrementation of the DL/UL COUNT value is maintained for these other radio bearers even though it is not strictly necessary to align the behavior with SRB1.

An additional option that may be used to speed up the PDCP processing could be to specify a rule (or behavior) stating that if the source node's PDCP entity for SRB1 in the source cell receives the message from the UE 10 indicating fallback to the source cell, i.e. the failure information message, with a gap in the UL COUNT sequence, it should regard this as correct and should not expect packet re-ordering to be needed. This prevents an unnecessary delay due to the PDCP entity waiting for a re-ordering timer (denoted "t-Reordering" in TS 38.323) to expire before forwarding the packet to the RRC entity.

As another option, a new indication, denoted as the failure indication, could be introduced in the message indicating to the source gNB that fallback to the source cell has occurred, where this indication would inform the source gNB that one UL COUNT value has intentionally been skipped, and that the source gNB consequently should not attempt to reorder the packets, e.g. by waiting for an additional packet filling the gap in the UL COUNT sequence. The indication could be included on the PDCP layer or on another protocol layer. If included on the PDCP layer, one option could be to utilize one or more of the reserved bits in the PDCP header in the PDCP data PDU for SRBs. Another option could be to introduce a new PDCP control PDU to be sent prior to the message informing the source gNB that fallback to the source cell has occurred, where this new PDCP control PDU would inform the source gNB about the skipped UL COUNT value for SRB1. If the indication is included on another layer, conceivable options could be a medium access control (MAC) control element (CE) or the RLC header (e.g. utilizing a reserved bit).

As yet another option, special treatment of the DL/UL COUNT value for SRB1, such as maintenance of the sequential incrementation during DAPS HO and fallback to the source cell, is only done in the case of intra-gNB DAPS HO is with key retention, whereas separate number sequences are used in inter-gNB DAPS HO cases and in the case of intra-gNB DAPS HO with key change.

There are also other ways of solving the keystream reuse problem for SRB1 at DAPS handover with key retention. One possibility is to vary one of the other input parameters to the IV in the encryption algorithm. For example, SRB1 in the source cell and the target cell could use different BEARER values. Another possibility is to introduce an additional input parameter to the IV or encryption algorithm to distinguish between SRB1 in the source cell and the target cell, such as the Physical Cell Identity (PCI). As one option, such an additional input parameter could be applied only when encrypting the first SRB1 message in the target cell (i.e. the RRCReconfigurationComplete message serving as the handover complete message), after which the regular algorithm (without the additional input parameter) would be used for subsequent SRB1 messages. The rule could for instance be that only Msg3 in the random access procedure (or MsgA PUSCH in case 2-step random access is used) when the UE accesses a DAPS HO target cell is encrypted using the modified algorithm. As another option, the additional input parameter would only be applied when encrypting the first SRB1 message after fallback to the source cell (i.e. the message indicating to the source node that fallback to the source cell has occurred, e.g. the failure information message), whereas subsequent SRB1 messages would be encrypted using the regular algorithm (without the additional input parameter).

Another solution could also be to forbid fallback to the source cell in case of DAPS handover with key retention. If the UE receives a handover command to perform DAPS handover with key retention, (e.g. based on absence of the RRC information element masterKeyUpdate in NR), if the DAPS handover fails (i.e. timer T304 expires), the UE does not trigger fallback to the source cell as it normally does upon DAPS handover failure (provided the source radio connection is still available). Instead, the UE triggers RRC re-establishment. As a variant of this alternative, the network may instruct the UE whether to apply fallback to the source cell or not using a field (e.g. defined as a Boolean) in the handover command message.

Figure 11:
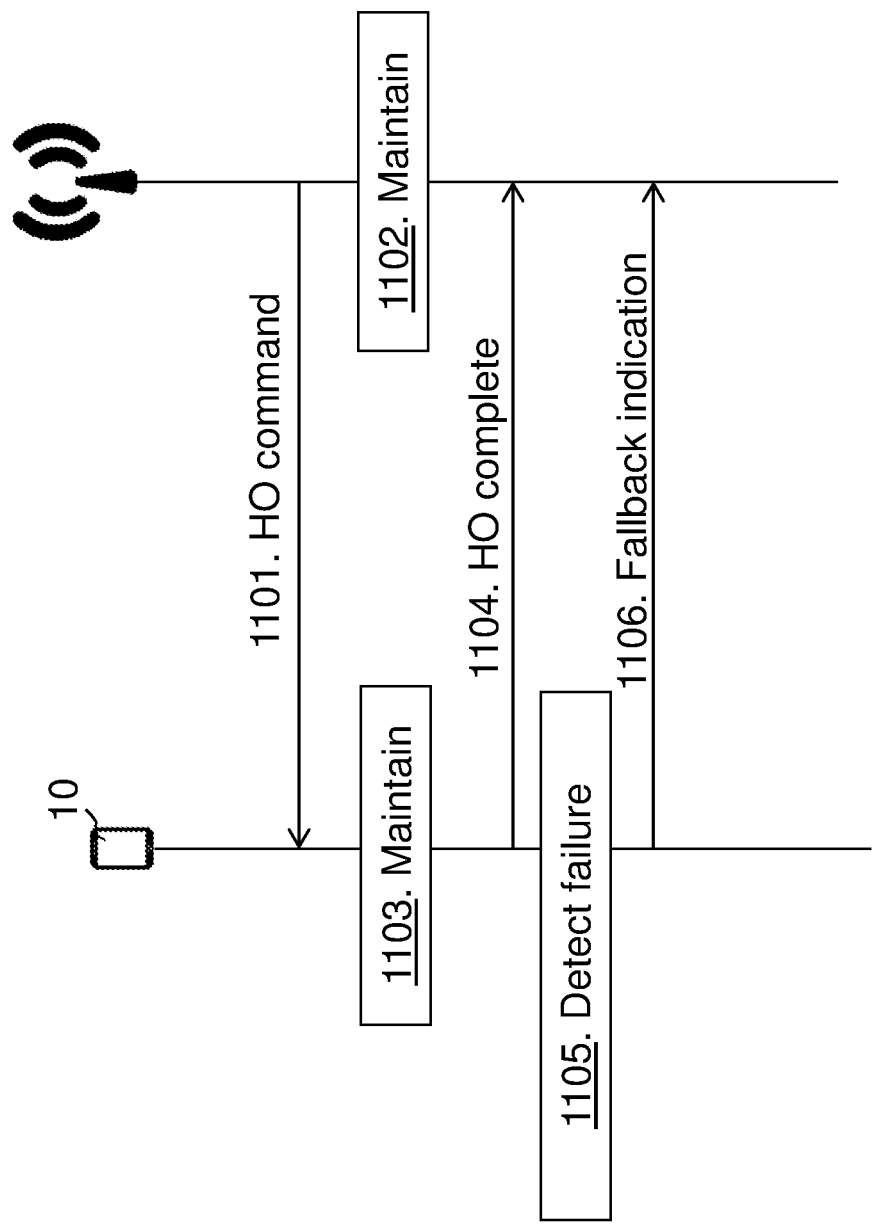
FIG. 11 shows a combined signalling scheme and flow chart according to embodiments herein.

FIG. 11 shows a combined flowchart and signalling scheme according to embodiments herein.

Action 1101. The radio network node 12 transmit a handover command for handing over the UE in a make before break handover, from the source cell to the target cell. The radio network node retains a security key for encrypting data communicated between the radio network node and the UE during HO without risking a keystream reuse.

Action 1102. The radio network node 12 may then maintain a PDCP DL/UL COUNT for SRB1 at the handover to the target cell and/or at fallback to the source cell of the UE.

Action 1103. The UE 10 receives the handover command and maintains a sequential incrementation of a PDCP DL/UL COUNT value for SRB1 at the handover to the target cell and/or at fallback to the source cell of the UE.

Action 1104. The UE 10 may then transmit a handover complete message to the radio network node 12 on the signalling radio bearer in the target cell using sequence number n+1, where n is the sequence number of the last packet received on the signalling radio bearer in the source cell.

Action 1105. The UE 10 may detect a handover failure such as a random access failure or a T304 expiry.

Action 1106. The UE 10 may transmit a fallback indication message on the signalling radio bearer in the source cell using sequence number n+2 or n+1 depending on if the handover complete message was transmitted by the UE in the source cell when the fallback was triggered.

Figure 12A:
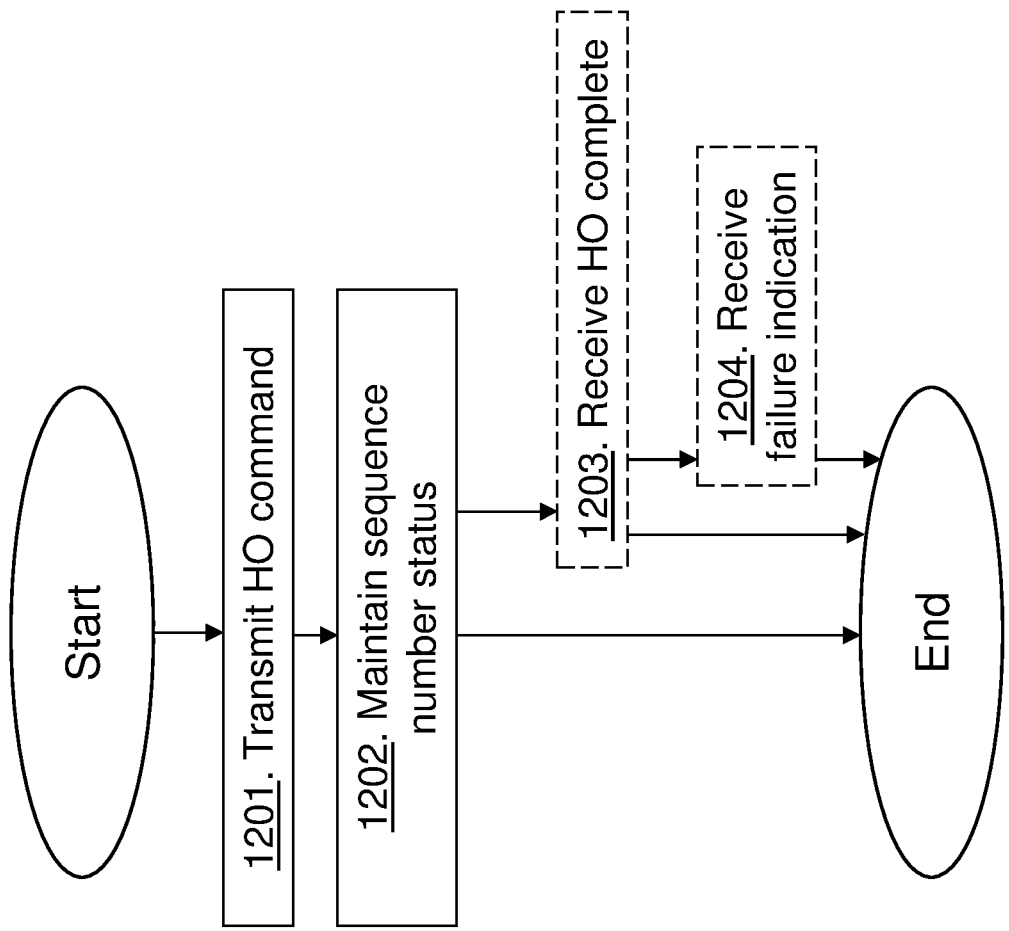
FIG. 12a shows a flow chart depicting a method performed by a radio network node according to embodiments herein.

The method actions performed by the radio network node 12 for handling communication of the UE in the wireless communications network according to embodiments will now be described with reference to a flowchart depicted in FIG. 12a. The actions do not have to be taken in the order stated below, but may be taken in any suitable order. Actions performed in some embodiments are marked with dashed boxes.

Action 1201. The radio network node 12 transmits the handover command for handing over the UE in a make before break handover, from the source cell to the target cell, wherein the security parameter for encrypting data communicated between the radio network node and the UE is retained during the handover. The security parameter may be the security key used for encrypting data communicated between the radio network node and the UE.

Action 1202. The radio network node 12 maintains the sequence number status for reception and/or transmission of the signalling radio bearer of the UE during the handover from the source cell to the target cell, and/or at the fallback from the target cell to the source cell, when the UE triggers the fallback to the source cell. The fallback may be triggered in case of a handover failure, such as random access failure or expiry of the T304 timer, in the target cell. The sequence number status may be a count number of a counter, e.g. incrementing packet sequence number with a next sequential value. Thus, the radio network node may maintain a count value of a counter in the radio network node for the UE for reception and transmission of a signalling radio bearer of the UE. For example, the radio network node 12 may maintain sequential incrementation of the PDCP DL/UL COUNT value for SRB1, at the handover to the target cell and at fallback to the source cell of the UE.

Action 1203. The radio network node 12 may further receive the handover complete message from the UE on the signalling radio bearer in the target cell using sequence number n+1, where n is the sequence number of the last packet received on the signalling radio bearer in the source cell. In case the random access in the target cell fails and the UE triggers fallback to the source cell, the radio network node maintains the sequence number status, also known as packet sequence numbering, for the signalling radio bearer during the fallback of the UE from the target cell to the source cell.

Action 1204. The radio network node 12 may further receive the fallback indication message on the signalling radio bearer in the source cell using packet sequence number n+2 or n+1 depending on if the handover complete message was transmitted by the UE in the source cell when the fallback was triggered.

The radio network node 12 may perform one or more of the following:
  transmitting a handover command to the UE which instructs the UE to perform a DAPS handover from a source cell to a target cell and wherein the security key is retained during the handover:
  maintaining, see action 1101, the sequence number status for a signalling radio bearer during the handover of the UE from the source cell to the target cell, e.g. maintaining sequentially numbering packets;
  the radio network node 12 may then receive the handover complete message from the UE 10 on the signalling radio bearer in the target cell using sequence number n+1, where n is the sequence number of the last packet received on the signalling radio bearer in the source cell;
  in case the random access in the target cell fails and the UE 10 triggers fallback to the source cell, the radio network node may maintain the counter value such as the sequence number status for the signalling radio bearer during the fallback of the UE from the target cell to the source cell; and
  the radio network node 12 may receive the fallback indication message (such as failure information) on the signalling radio bearer in the source cell using packet sequence number n+2 or n+1 depending on if the handover complete message was transmitted by the UE in the source cell when the fallback was triggered.

Figure 12B:
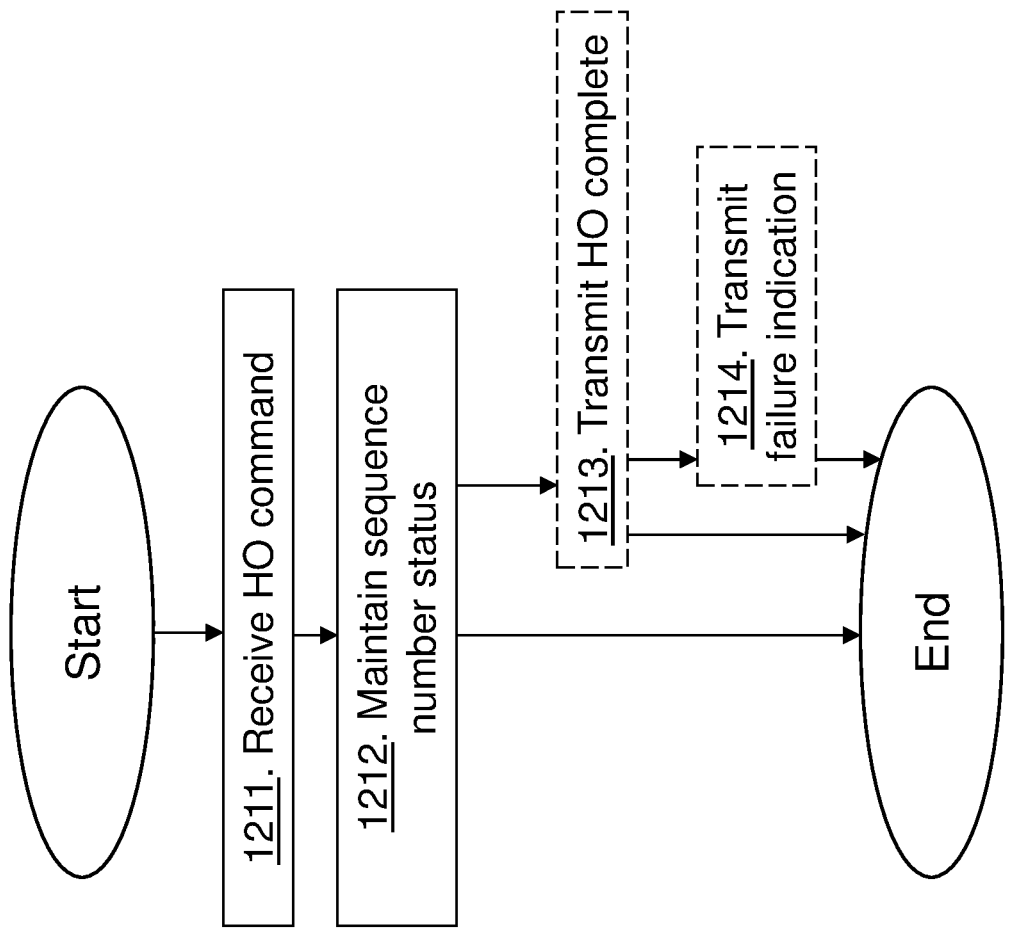
FIG. 12b shows a flow chart depicting a method performed by a UE according to embodiments herein.

The method actions performed by the UE 10 for handling communication of the UE in the wireless communications network according to embodiments will now be described with reference to a flowchart depicted in FIG. 12b. The actions do not have to be taken in the order stated below, but may be taken in any suitable order. Actions performed in some embodiments are marked with dashed boxes.

Action 1211. The UE 10 receives the handover command for handing over the UE in a make before break handover, from the source cell to the target cell, wherein the security parameter used for encrypting data communicated between the radio network node and the UE, is retained during the handover. The security parameter may be the security key used for encrypting data communicated between the radio network node and the UE.

Action 1212. The UE 10 maintains the sequence number status for reception and/or transmission of the signalling radio bearer of the UE during the handover from the source cell to the target cell, and/or at the fallback from the target cell to the source cell, when the UE triggers the fallback to the source cell. The sequence number status may be a count number of a counter. For example, the UE may maintain a count value of a counter in the UE for reception and transmission of a signalling radio bearer of the UE. The UE may maintain sequential incrementation of the PDCP DL/UL COUNT value for SRB1, at the handover to the target cell and at fallback to the source cell of the UE.

Action 1213. The UE 10 may, wherein the handover command instructs the UE to perform a DAPS handover from the source cell to the target cell and wherein the security parameter is retained during the handover; and the sequence number status for a signalling radio bearer during the handover from the source cell to the target cell is maintained, transmit the handover complete message to the radio network node on the signalling radio bearer in the target cell using sequence number n+1. Parameter "n" is the sequence number of the last packet transmitted on the signalling radio bearer in the source cell.

Action 1214. The UE 10 may, in case fallback to the source cell is triggered due to handover failure in the target cell, the sequence number status is maintained for the signalling radio bearer during the fallback from the target cell to the source cell, transmit the fallback indication message on the signalling radio bearer in the source cell using packet sequence number n+2 or n+1 depending on if the handover complete message was transmitted in the target cell when the fallback was triggered. The fallback may be triggered in case of a handover failure in the target cell.

The UE 10 may perform one or more of the following:
- receives the handover command from the radio network node wherein the UE is instructed to perform a DAPS handover from the source cell to the target cell and wherein the security key is retained during the handover.
- maintains the sequence number status for a signalling radio bearer during the handover from the source cell to the target cell, e.g. continuing incrementing packet sequence number of already received/transmitted packets;
- may transmit the handover complete message to the radio network node on the signalling radio bearer in the target cell using sequence number n+1, where n is the sequence number of the last packet transmitted on the signalling radio bearer in the source cell.
- in case fallback to the source cell is triggered due to handover failure in the target cell, the UE may maintain the sequence number status for the signalling radio bearer during the fallback from the target cell to the source cell, e.g. continuing incrementing packet sequence number of already received/transmitted packets; and
- may transmit a fallback indication message (such as failure information) on the signalling radio bearer in the source cell using packet sequence number n+2 or n+1 depending on if the handover complete message was transmitted in the target cell when the fallback was triggered.

Figure 13A:
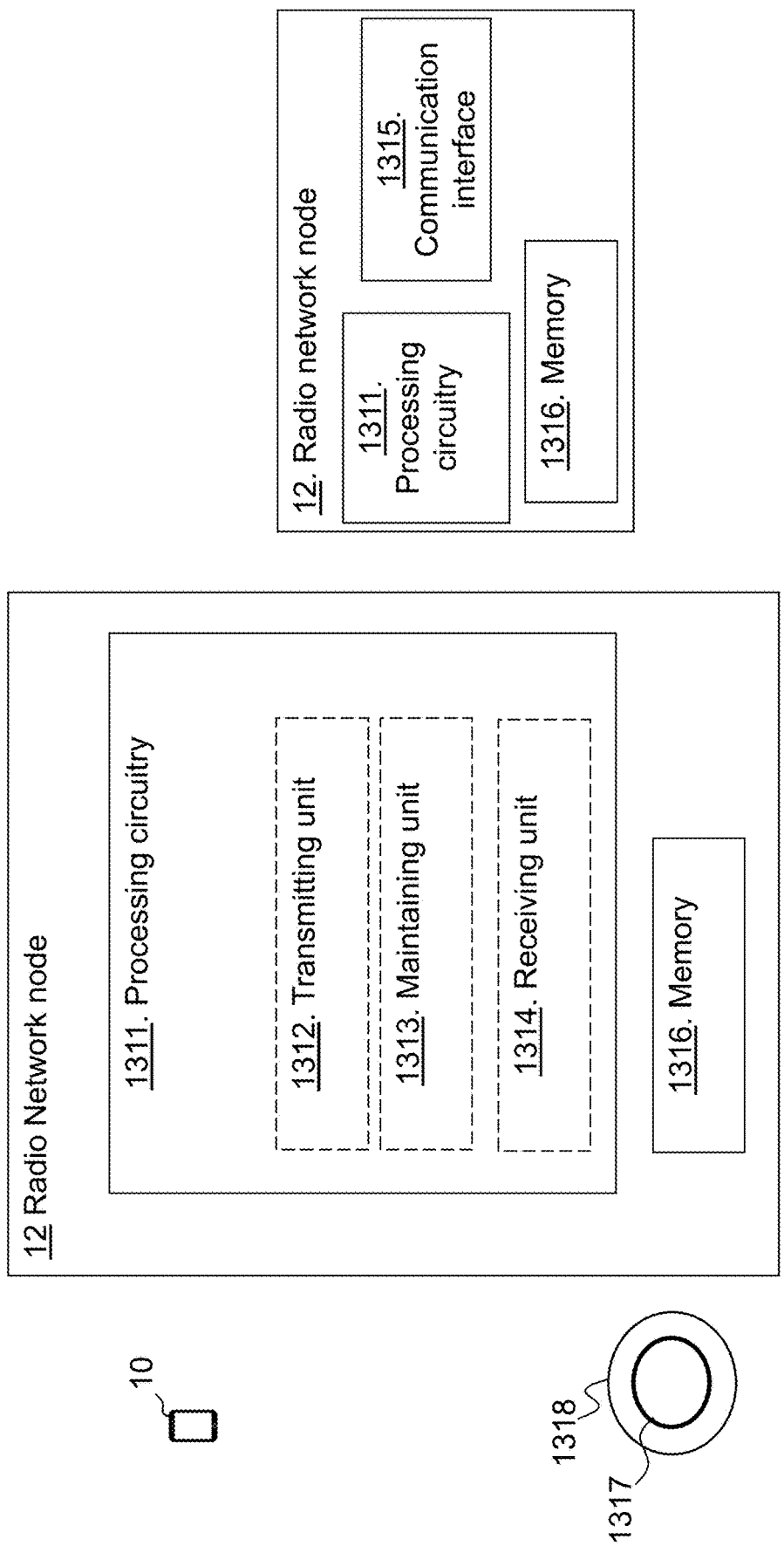
FIG. 13a shows a block diagram depicting radio network nodes according to embodiments herein.

FIG. 13a is a block diagram depicting the radio network node 12 for handling communication of the UE 10 in the wireless communication network 1 according to embodiments herein.

The radio network node 12 may comprise processing circuitry 1311, e.g. one or more processors, configured to perform the methods herein.

The radio network node 12 may comprise a transmitting unit 1312, e.g. a transmitter or transceiver. The radio network node 12, the processing circuitry 1311, and/or the transmitting unit 1312 is configured to transmit to the UE, the handover command for handing over the UE 10 in a make before break handover, from the source cell to the target cell, wherein the security parameter for encrypting data communicated between the radio network node and the UE is retained during the handover. The security parameter may comprise one or more security keys used for encrypting data communicated between the radio network node and the UE 10.

The radio network node 12 may comprise a maintaining unit 1313. The radio network node 12, the processing circuitry 1311, and/or the maintaining unit 1313 is configured to maintain the sequence number status, e.g. the count number of the counter, for reception and/or transmission of the signalling radio bearer of the UE 10 during the handover from the source cell to the target cell, and/or maintain the sequence number status, for reception and/or transmission of the signalling radio bearer of the UE 10 at the fallback from the target cell to the source cell, when the UE 10 triggers the fallback to the source cell, e.g. in case of a handover failure in the target cell. The radio network node 12, the processing circuitry 1311, and/or the maintaining unit 1313 may be configured to maintain the count value of the counter in the radio network node for the UE for reception and transmission of a signalling radio bearer of the UE. The radio network node 12, the processing circuitry 1311, and/or the maintaining unit 1313 may be configured to maintain sequential incrementation of the PDCP DL/UL COUNT value for SRB1 at the handover to the target cell and at fallback to the source cell of the UE.

The radio network node 12 may comprise a receiving unit 1314, e.g. a receiver or transceiver. The radio network node 12, the processing circuitry 1311, and/or the receiving unit 1314 may be configured to receive the handover complete message from the UE on the signalling radio bearer in the target cell using sequence number n+1, where n is the sequence number of the last packet received on the signalling radio bearer in the source cell. In case the random access in the target cell fails and the UE triggers fallback to the source cell, the radio network node 12, the processing circuitry 1311, and/or the maintaining unit 1313 may be configured to maintain the sequence number status for the signalling radio bearer during the fallback of the UE from the target cell to the source cell. The radio network node 12, the processing circuitry 1311, and/or the receiving unit 1314 may be configured to receive the fallback indication message on the signalling radio bearer in the source cell using packet sequence number n+2 or n+1 depending on if the handover complete message was transmitted by the UE in the source cell when the fallback was triggered.

The radio network node 12 further comprises a memory 1316. The memory comprises one or more units to be used to store data on, such as indications, UE capability, voice over packet switched support indications, security indications, security parameters, PDCP entity, sequence numbers, applications to perform the methods disclosed herein when being executed, and similar. The radio network node 12 may comprise a communication interface 1315 comprising e.g. a receiver, a transmitter, a transceiver and/or one or more antennas. Thus, it is herein provided the radio network node 12 for handling communication of the UE in the wireless communication network, wherein the radio network node comprises processing circuitry and the memory, said memory comprising instructions executable by said processing circuitry whereby said radio network node 12 is operative to perform any of the methods herein.

The methods according to the embodiments described herein for the radio network node 12 are respectively implemented by means of e.g. a computer program product 1317 or a computer program, comprising instructions, i.e., software code portions, which, when executed on at least one processor, cause the at least one processor to carry out the actions described herein, as performed by the radio network node 12. The computer program product 1317 may be stored on a computer-readable storage medium 1318, e.g. a disc, a universal serial bus (USB) stick or similar. The computer-readable storage medium 1318, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

Figure 13B:
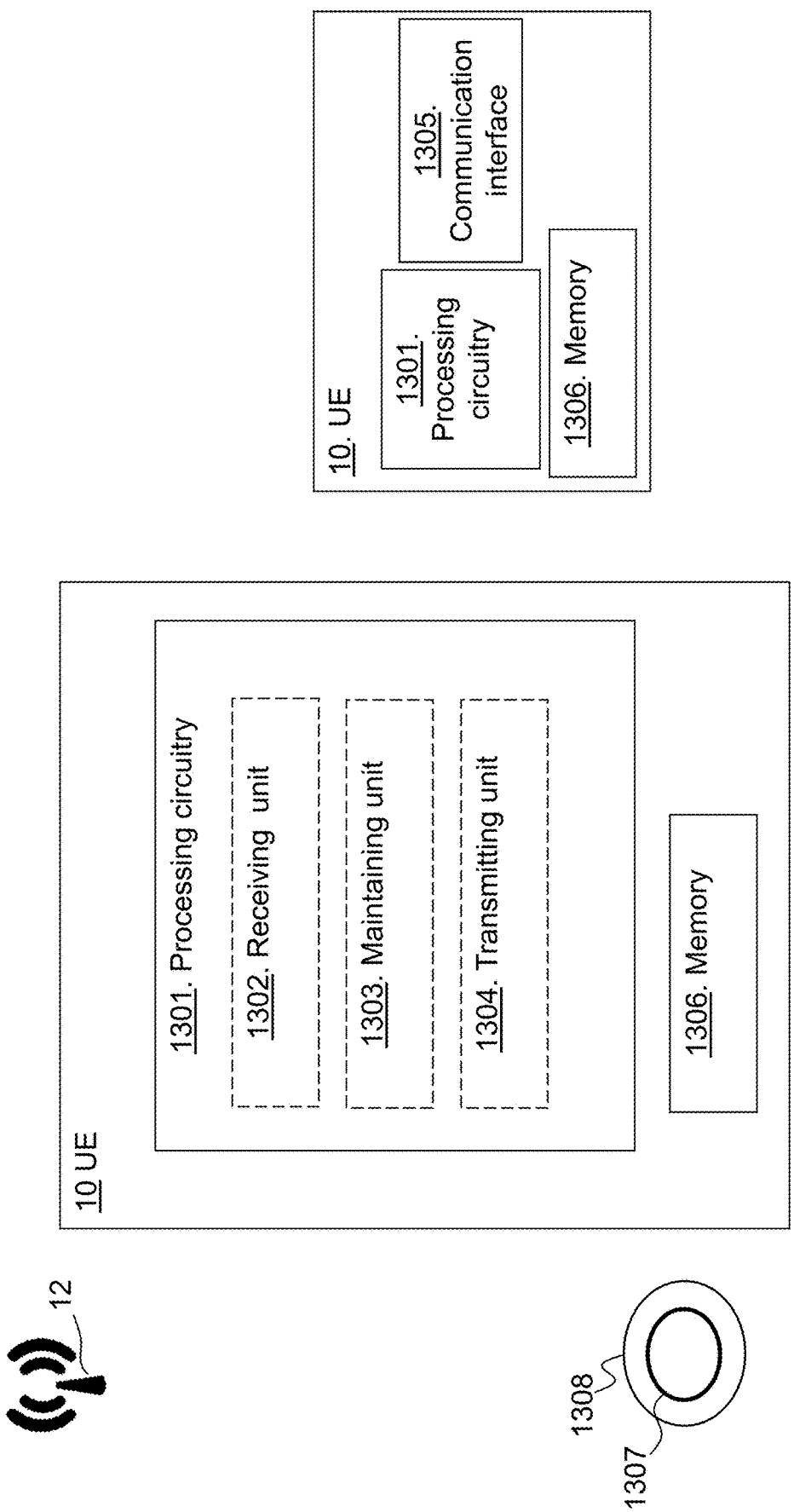
FIG. 13b shows a block diagram depicting UEs according to embodiments herein.

FIG. 13*b* is a block diagram depicting the UE for handling communication of the UE in the wireless communication network according to embodiments herein.

The UE 10 may comprise processing circuitry 1301, such as one or more processors, configured to perform methods herein.

The UE 10 may comprise a receiving unit 1302, e.g. a receiver or transceiver. The UE 10, the processing circuitry 1301, and/or the receiving unit 1302 may be configured to receive from the radio network node 12, the handover command for handing over the UE 10 in a make before break handover, from the source cell to the target cell, wherein the security parameter used for encrypting data communicated between the radio network node and the UE is retained during the handover. The security parameter may comprise one or more security keys used for encrypting data communicated between the radio network node and the UE 10.

The UE 10 may comprise a maintaining unit 1303. The UE 10, the processing circuitry 1301, and/or the maintaining unit 1303 is configured to maintain the sequence number status, e.g. the count number of the counter, for reception and/or transmission of the signalling radio bearer of the UE 10 during the handover from the source cell to the target cell, and/or maintain the sequence number status, for reception and/or transmission of the signalling radio bearer of the UE 10 at the fallback from the target cell to the source cell, when the UE 10 triggers the fallback to the source cell, e.g. in case of a handover failure in the target cell. The UE 10, the processing circuitry 1301, and/or the maintaining unit 1303 may be configured to maintain the count value of the counter in the UE for reception and transmission of a signalling radio bearer of the UE. The UE 10, the processing circuitry 1301, and/or the maintaining unit 1303 may be configured to maintain sequential incrementation of the PDCP DL/UL COUNT value for SRB1 at the handover to the target cell and at fallback to the source cell of the UE.

The UE 10 may comprise a transmitting unit 1304, e.g. a transmitter and/or a transceiver. The UE 10, the processing circuitry 1301, and/or the transmitting unit 1304 may be configured to, wherein the handover command instructs the UE to perform a DAPS handover from the source cell to the target cell and wherein the security key is retained during the handover; and the sequence number status for the signalling radio bearer during the handover from the source cell to the target cell is maintained; transmit the handover complete message to the radio network node on the signalling radio bearer in the target cell using sequence number n+1. The n is the sequence number of the last packet transmitted on the signalling radio bearer in the source cell. In case fallback to the source cell is triggered due to handover failure in the target cell, the sequence number status is maintained for the signalling radio bearer during the fallback from the target cell to the source cell, and the UE, the processing circuitry 1301, and/or the transmitting unit 1304 may be configured to transmit the fallback indication message on the signalling radio bearer in the source cell using sequence number status n+2 or n+1 depending on if the handover complete message was transmitted in the target cell when the fallback was triggered.

The UE 10 further comprises a memory 1306. The memory comprises one or more units to be used to store data on, such as indications, voice support, messages, security indications, sequence numbers, applications to perform the methods disclosed herein when being executed, and similar. The UE 10 may comprise a communication interface 1305 comprising e.g. a receiver, a transmitter, a transceiver, and/or one or more antennas. Thus, it is herein provided the UE 10 for handling communication of the UE in the wireless communication network, wherein the UE comprises processing circuitry and the memory, said memory comprising instructions executable by said processing circuitry whereby said UE 10 is operative to perform any of the methods herein.

The methods according to the embodiments described herein for the UE 10 are respectively implemented by means of e.g. a computer program product 1307 or a computer program, comprising instructions, i.e., software code portions, which, when executed on at least one processor, cause the at least one processor to carry out the actions described herein, as performed by the UE 10. The computer program product 1307 may be stored on a computer-readable storage medium 1308, e.g. a disc, a universal serial bus (USB) stick or similar. The computer-readable storage medium 1308, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Figure 14:
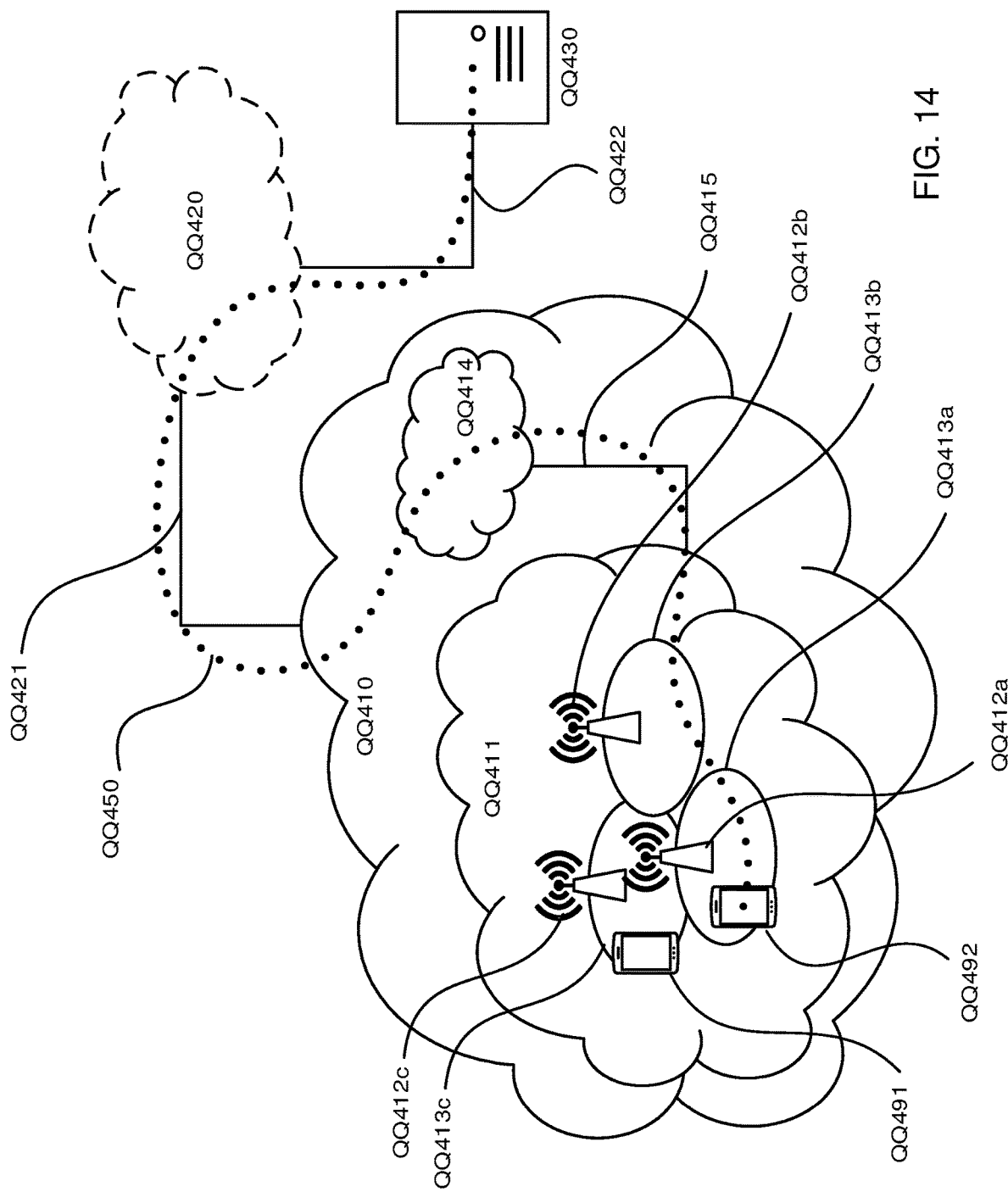
FIG. 14 schematically illustrates a telecommunication network connected via an intermediate network to a host computer.

FIG. 14: Telecommunication network connected via an intermediate network to a host computer in accordance with some embodiments With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points being examples of the radio network node 12 above, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example being examples of the wireless device 10 above, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
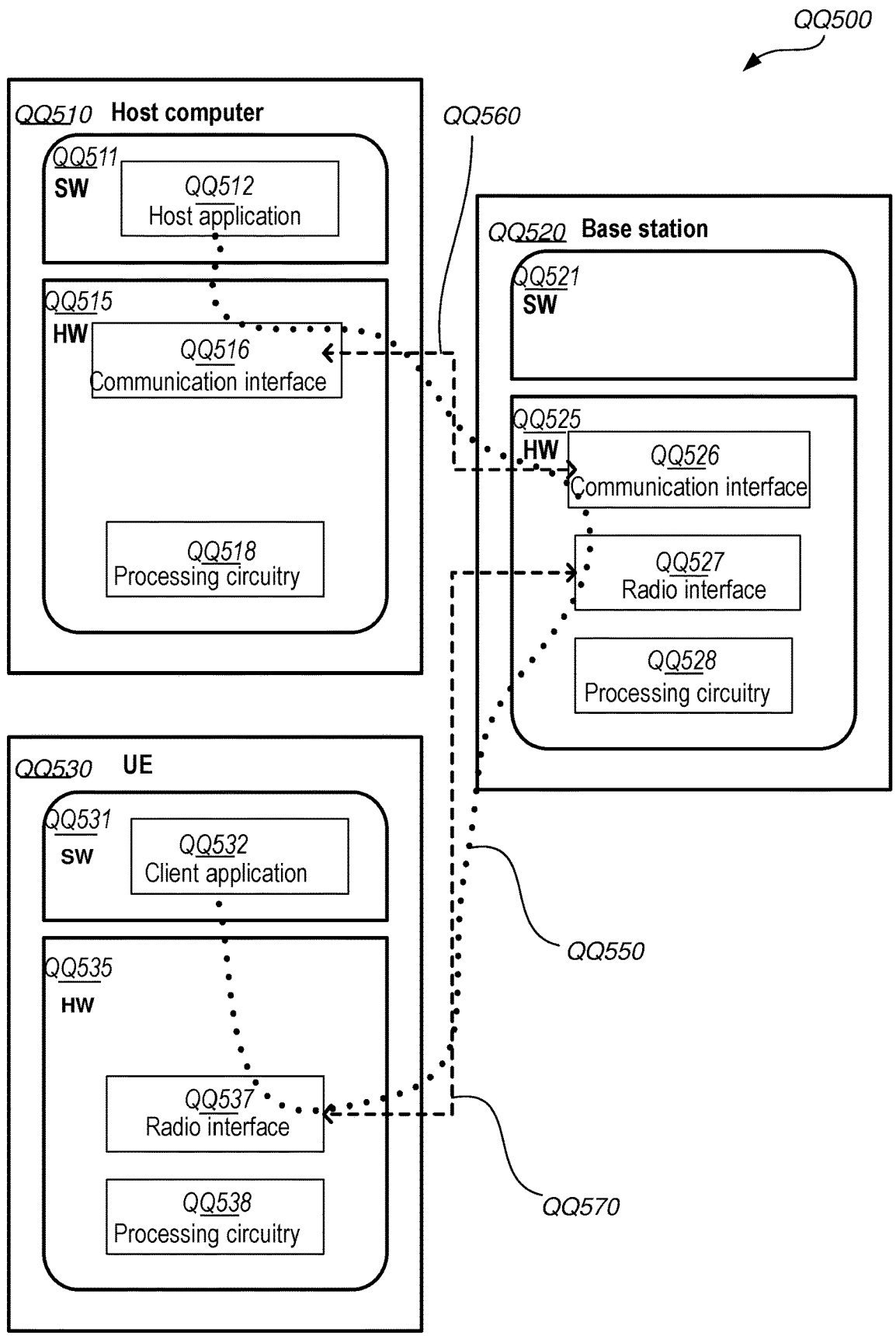
FIG. 15 is a generalized block diagram of a host computer communicating via a base station with a user equipment over a partially wireless connection.

FIG. 15: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510.

In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency since communication of the data need not be retransmitted as often and communication is efficiently improved during handover and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
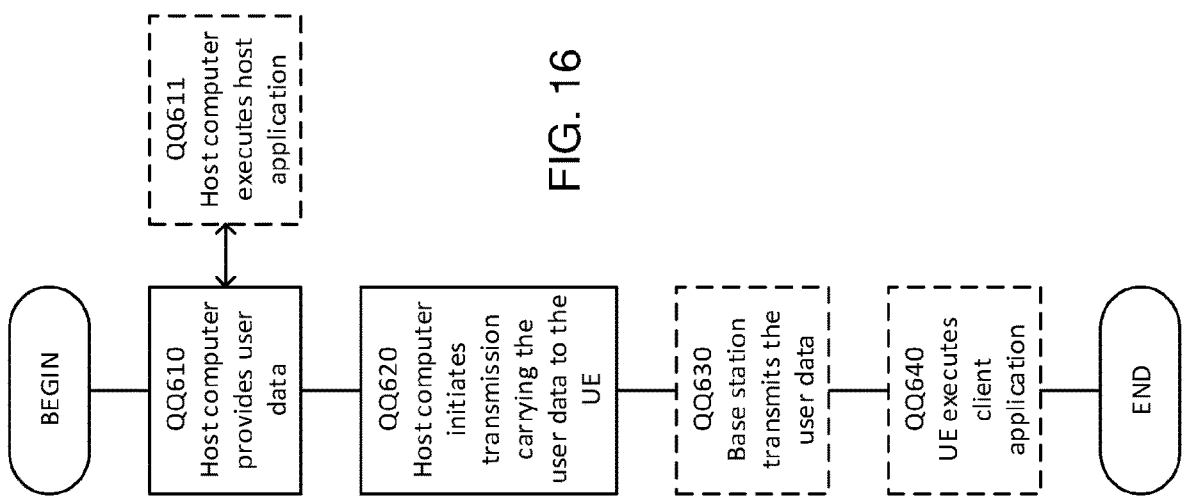

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
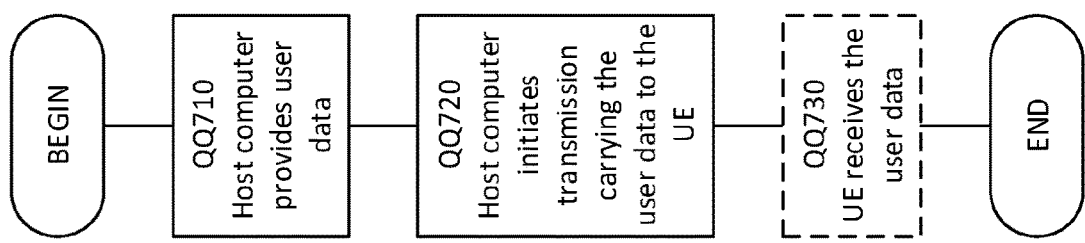
FIGS. 16-19 are flowcharts illustrating methods implemented in a communication system including a host computer, a base station and a user equipment.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
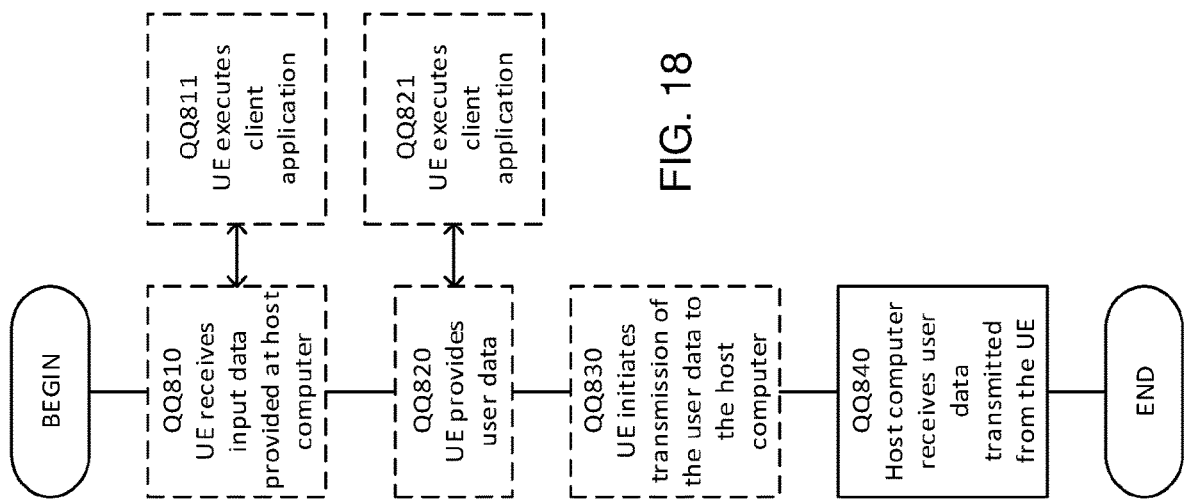

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
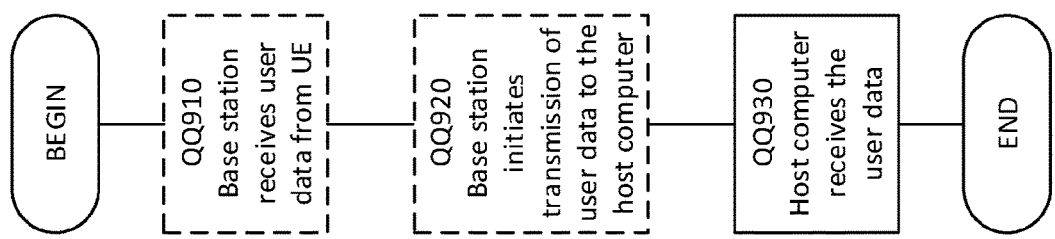

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or UE, for example.

The solution described herein may comprise one or more of the following embodiments.

In some embodiments herein a method performed by a radio network node 12 for handling a communication of a user equipment, UE 10, in a wireless communication network. The method comprising:

transmitting to the UE, a handover command for handing over the UE from a source cell to a target cell, wherein the handover command comprises a security indication, and wherein the security indication indicates that the security parameter is retained for communication over the target cell when determined to retain the security parameter for communication of the UE during a handover of the UE; and applying same security parameter and compression process of data for communication of the UE for both the source cell and the target cell maintaining a count value of a counter in the radio network node for the UE for reception and transmission of a signalling radio bearer of the UE, e.g. a PDCP DL/UL COUNT value for SRB1, is maintained at a handover to a target cell and at fallback to a source cell of the UE.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATION

3GPP 3$^{rd}$ Generation Partnership Project
4G 4$^{th}$ Generation
5G 5$^{th}$ Generation
5GC 5G Core
5GS 5G System
AMF Access and Mobility management Function
CN Core Network
CU Central Unit
DAPS Dual Active Protocol Stack
DL Downlink
DRB Data Radio Bearer
DU Distributed Unit
eNB Evolved Node B (A radio base station in LTE.)
E-UTRAN Evolved Universal Terrestrial Radio Access Network
gNB 5G Node B (A radio base station in NR.)
HFN Hyper Frame Number
HO Handover
LTE Long Term Evolution
MAC Medium Access Control
MAC CE MAC Control Element
Msg Message NG The interface/reference point between the RAN and the CN in 5G/NR.
NG-C The control plane part of NG (between a gNB and an AMF).
NG-RAN Next Generation Radio Access Network
NG-U The user plane part of NG (between a gNB and a UPF).
NR New Radio
OFDM Orthogonal Frequency Division Multiplex
PCI Physical Cell Identity
PDCP Packet Data Convergence Protocol
PHY Physical (Layer)
PUSCH Physical Uplink Shared Channel
RAN Radio Access Network
RLC Radio Link Control
ROHC RObust Header Compression
RRC Radio Resource Control
SN Sequence Number
SRB Signalling Radio Bearer
TS Technical Specification
TX Transmit/Transmission/Transmitter
UE User Equipment
UL Uplink
UPF User Plane Function
URLLC Ultra-Reliable Low-Latency Communication
Xn The interface/reference point between two gNBs.
XnAP Xn Application Protocol

APPENDIX

1 Introduction

This contribution discusses the changes required to support DAPS handover without key change which is one open issues in the email discussion [1].

2 Discussion 2.1 Key Retention During Regular Handover

In NR, it is optional for the network to change the security key for intra-node handovers, i.e. handovers where the source and target cell belong to the same gNB. This is a difference compared to LTE where key change is mandatory for all types of handovers, including intra-node handover. Retaining the security key during handover reduces processing since no new key is derived and packets that are buffered in the PDCP layer and which have already been encrypted do not need to be reencrypted when they are transmitted/re-transmitted in the target cell. Note that intra-node handover also includes the CU-DU split cases where the source and target cell belong to the same gNB-DU or two different gNB-DUs belonging to the same gNB-CU.

Observation 1 Handover without Key Change is Supported in NR for Intra-Node Handover For DRBs mapped on RLC AM, data recovery is initiated for the PDCP entity instead of re-establishment when handover is performed without key change. Data recovery prevents packet loss and functions similar to re-establishment in that all unacknowledged packets are retransmitted on the target link. In contrast to re-establishment, however, the retransmitted packets are not recompressed or reencrypted before transmission, i.e. the PDCP PDUs that were previously transmitted on the source link can be directly transmitted on the target link without modification.

Observation 2 For DRBs Using RLC AM, Data Recovery is Initiated for the PDCP Entity Instead of Re-Establishment when Handover is Performed without Key Change For SRBs and DRBs mapped on RLC UM, neither PDCP re-establishment nor PDCP data recovery is performed during handover without key change, i.e. the PDCP entity remains as it is. This means in particular that the PDCP COUNT is maintained instead of being reset to 0.

Observation 3 For SRBs and DRBs Mapped on RLC UM, the PDCP Entity is not Re-Established when Handover is Performed without Key Change which means the PDCP COUNT is Maintained 2.3 Key Retention During DAPS Handover Since handover without key change is supported for regular handover it seems natural to support it also for DAPS handover. Furthermore, DAPS handover is intended for delay critical communications such as IIoT, where the network is deployed inside e.g. a factory. Such networks can be served by a single node with one or more cells covering the factory floor which means that all handovers will be intra-node handovers. For this reason, it makes sense to optimize the intra-node DAPS handover case.

Proposal 1 DAPS Handover without Key Change is Supported for Intra-Node Handover If the security key is retained during a handover the RoHC context should also be retained for DAPS DRBs to avoid the need to recompress and then reencrypt packets which have already been compressed using the old (source) RoHC context and encrypted using the common security key. If the packet is retransmitted in the target cell (which is the case for DRBs mapped on RLC AM) recompressing and reencrypting the packet would also be a security risk since it results in so called keystream re-use. One could consider a solution where the retransmitted packets are compressed using the old (source) RoHC context and all new packets are compressed using a new (target) RoHC context. This would avoid the key stream re-use problem but causes confusion for the receiver since it cannot distinguish the retransmitted packets from the new packets and hence it does not know which RoHC context to use for the decompression. Therefore, the simplest solution is to use the old (source) RoHC context for all packets transmitted on the target link.

Proposal 2 For DAPS DRBs, the Same RoHC Context Shall be Applied for Both the Source and Target Link when DAPS Handover is Performed without Key Change Proposal 3 For DAPS DRBs Mapped on RLC AM, Retransmitted Packets shall not be Recompressed or Reencrypted During the UL Switch when DAPS Handover is Performed without Key Change For SRBs and non-DAPS DRBs the handling would be similar as in a regular handover without key change. That is, the PDCP entity is not reestablished and the COUNT is maintained.

Proposal 4 For SRBs and non-DAPS DRBs, the PDCP COUNT is Maintained when DAPS Handover is Performed without Key Change (Like in to Regular Handover without Key Change)

However, one new aspect to consider is the fallback to source in case of DAPS handover failure. To prevent keystream re-use it is important that the COUNT is maintained also during fallback to source cell to ensure that a packet transmitted in the source cell is not encrypted with the same key and COUNT as a packet transmitted in the target cell. As an example of how this may occur, consider the scenario in the figure below where a DAPS handover without key change is triggered by the network and the UE sends the handover complete message on SRB1 in the target cell. Since the COUNT is maintained at handover the handover complete message is transmitted with COUNT=n+1, where n is the COUNT of the last RRC message transmitted on SRB1 in the source cell before the handover was triggered. If the random access procedure fails and fallback to source cell is triggered, the UE will send a failure indication on SRB1 in the source cell. If the COUNT is not maintained during fallback the failure indication will be encrypted with the same key and same COUNT (n+1) as the handover complete message which results in keystream reuse.

FIG. 10 Keystream Reuse at Fallback to Source Cell at DAPS Handover without Key Change Therefore, we propose:

| | |
|---|---|
| Proposal 5 | For SRBs and non-DAPS DRBs, the PDCP COUNT is maintained also at fallback to source cell when DAPS handover is performed without key change. |
| 4 | Conclusion |

In the previous sections we made the following observations:

| | |
|---|---|
| Observation 1 | Handover without key change is supported in NR for intra-node handover |
| Observation 2 | For DRBs using RLC AM, data recovery is initiated for the PDCP entity instead of re-establishment when handover is performed without key change. |
| Observation 3 | For SRBs and DRBs mapped on RLC UM, the PDCP entity is not re-established when handover is performed without key change which means the PDCP COUNT is maintained. |

Based on the discussion in the previous sections we propose the following:

| | |
|---|---|
| Proposal 1 | DAPS handover without key change is supported for intra-node handover |
| Proposal 2 | For DAPS DRBs, the same RoHC context shall be applied for both the source and target link when DAPS handover is performed without key change. |
| Proposal 3 | For DAPS DRBs mapped on RLC AM, retransmitted packets shall not be recompressed or reencrypted during the UL switch when DAPS handover is performed without key change. |
| Proposal 4 | For SRBs and non-DAPS DRBs, the PDCP COUNT is maintained when DAPS handover is performed without key change (like in to regular handover without key change) |
| Proposal 5 | For SRBs and non-DAPS DRBs, the PDCP COUNT is maintained also at fallback to source cell when DAPS handover is performed without key change. |

Text proposals for TS 38.331 and TS 38.323 showing how key retention for DAPS handover can be implemented can be found in the appendix.

5 References

[1] [108#66][LTE NR Mob] Open issues for LTE and NR mobility (Intel)
[2] [108#34][NR Mob] Running RRC CR for CHO and DAPS (Intel)
[3] [108#64][LTE NR Mob] Running CRs for LTE and NR PDCP on mobility (Huawei)

A Annex

A.1 Text Proposal for 38.331

Below is a text proposal for the NR RRC specification (TS 38.331) implemented on top of the running CR discussed in [2]. Changes are added using author "Ericsson".

START OF CHANGES 5.3.5.5.2  Reconfiguration with sync

The UE shall perform the following actions to execute a reconfiguration with sync.
<...>
1> If dapsConfig is configured for any DRB:
    2> create a MAC entity for the target with the same configuration as the MAC entity for the source;
    <...>
    2> for each SRB:
        3> establish a PDCP entity for the target as specified in TS 38.323 [5], with the same configuration as the PDCP entity for the source;
        3> establish an RLC entity or entities for the target, with the same configurations as for the source;
        3> establish the logical channel for the target PCell, with the same configurations as for the source;
    2> suspend SRBs for the source;
    NOTE 3: A UE configured with DAPS, stops following operations in source: system information updates, short messages (for NR) and paging.

NEXT CHANGE 5.3.5.6.3  SRB addition/modification

The UE shall:
<...>
1> for each srb-Identity value included in the srb-ToAddModList that is part of the current UE configuration:
    2> if the reestablishPDCP is set:

-continued

3>    if target RAT of handover is E-UTRA/5GC; or
        3>    if the UE is connected to E-UTRA/5GC:
            4>    if the UE is capable of E-UTRA/5GC, but not capable of NGEN-DC:
                5>    configure the PDCP entity to apply the integrity protection algorithm and $K_{RRCint}$ key configured/derived as specified in TS 36.331 [10], i.e. the integrity protection configuration shall be applied to all subsequent messages received and sent by the UE, including the message used to indicate the successful completion of the procedure;
                5>    configure the PDCP entity to apply the ciphering algorithm and $K_{RRCenc}$ key configured/derived as specified in TS 36.331 [10], i.e. the ciphering configuration shall be applied to all subsequent messages received and sent by the UE, including the message used to indicate the successful completion of the procedure;
            4>    else (i.e., a UE capable of NGEN-DC):
                5>    configure the PDCP entity to apply the integrity protection algorithm and $K_{RRCint}$ key associated with the master key ($K_{eNB}$) or secondary key (S-$K_{gNB}$), as indicated in keyToUse, i.e. the integrity protection configuration shall be applied to all subsequent messages received and sent by the UE, including the message used to indicate the successful completion of the procedure;
                5>    configure the PDCP entity to apply the ciphering algorithm and $K_{RRCenc}$ key associated with the master key ($K_{eNB}$) or secondary key (S-$K_{gNB}$) as indicated in keyToUse, i.e. the ciphering configuration shall be applied to all subsequent messages received and sent by the UE, including the message used to indicate the successful completion of the procedure;
        3>    else (i.e., UE connected to NR or UE in EN-DC):
            4>    configure the PDCP entity to apply the integrity protection algorithm and $K_{RRCint}$ key associated with the master key ($K_{eNB}/K_{gNB}$) or secondary key (S-$K_{gNB}$), as indicated in keyToUse , i.e. the integrity protection configuration shall be applied to all subsequent messages received and sent by the UE, including the message used to indicate the successful completion of the procedure;
            4>    configure the PDCP entity to apply the ciphering algorithm and $K_{RRCenc}$ key associated with the master key ($K_{eNB}/K_{gNB}$) or secondary key (S-$K_{gNB}$) as indicated in keyToUse, i.e. the ciphering configuration shall be applied to all subsequent messages received and sent by the UE, including the message used to indicate the successful completion of the procedure;
        3>    re-establish the PDCP entity of this SRB as specified in TS 38.323 [5];
    2>    else, if the discardOnPDCP is set:
        3>    trigger the PDCP entity to perform SDU discard as specified in TS 38.323 [5];
    2>    if the pdcp-Config is included:
        3>    reconfigure the PDCP entity in accordance with the received pdcp-Config.

NEXT CHANGE 5.3.5.6.5    DRB addition/modification

The UE shall:
<...>
1>    for each drb-Identity value included in the drb-ToAddModList that is part of the current UE configuration and configured with dapsConfig:
    2>    reconfigure the PDCP entity as DAPS PDCP entity as specified in TS 38.323 [5] and configure it in accordance with the received pdcp-Config;

Editor's note: FFS on what target can configure in pdcp-Config.

2>    if the RRCReconfiguration includes the masterKeyUpdate:
        3>         configure the DAPS PDCP entity to associate the RLC entity of target with the target's ciphering function, integrity protection function and ROHC function;
        3>    if the target 's ciphering function of DAPS PDCP entity of this DRB is not configured with cipheringDisabled:
            4>    configure the ciphering function of target for the DAPS PDCP entity with the ciphering algorithm according to securityConfig and apply the $K_{UPenc}$ key associated with the master key ($K_{gNB}$) or the secondary key (S-$K_{gNB}$), as indicated in keyToUse, i.e. the ciphering configuration shall be applied to all subsequent PDCP PDUs received from target and sent to target by the UE;
        3>    if the target's integrity protection function of DAPS PDCP entity of this DRB is configured with integrityProtection:
            4>    configure the integrity protection function of target for the DAPS PDCP entity with the integrity protection algorithms according to securityConfig and apply the $K_{UPint}$ key associated with the master key ($K_{gNB}$) or the secondary key (S-$K_{gNB}$) as indicated in keyToUse;
    2>    else:
        3>         configure the DAPS PDCP entity to associate the RLC entity of target with the source's ciphering function, integrity protection function and ROHC function;

NEXT CHANGE 5.3.5.8.3    T304 expiry (Reconfiguration with sync Failure)

The UE shall:
1>    if T304 of the MCG expires:
    2>    release dedicated preambles provided in rach-ConfigDedicated if configured;
    2>    if dapsConfig is configured for any DRB, and radio link failure is not detected in the source PCell, according to subclause 5.3.10.3:

-continued

3> release target PCell configuration;
        3> reset target MAC and release the target MAC configuration;
        3> for each DRB with a DAPS PDCP entity:
            4> re-establish the RLC entity for the target;
            4> release the RLC entity and the associated logical channel for the target;
            4> reconfigure the PDCP entity to normal PDCP as specified in TS 38.323 [5];
        3> for each SRB:
            4> release the PDCP entity for the target;
            4> release the RLC entity and the associated logical channel for the target;
        3> release the physical channel configuration for the target;
        3> discard the keys used in target (the $K_{gNB}$ key, the $S\text{-}K_{gNB}$ key, the $S\text{-}K_{eNB}$ key, the $K_{RRCenc}$ key, the $K_{RRCint}$ key, the $K_{UPint}$ key and the $K_{UPenc}$ key), if any;
Editor's note: FFS on what target PCell configuration to be released.
        3> resume suspended SRBs in the source;
Editor's note: FFS on handling SCells and how to resume DRBs.
        3> initiate the failure information procedure as specified in subclause 5.7.5 to report DAPS handover failure.
    2> else:
        3> revert back to the UE configuration used in the source PCell;
        3> initiate the connection re-establishment procedure as specified in subclause 5.3.7.
NOTE 1: In the context above, "the UE configuration" includes state variables and parameters of each radio bearer.
1> else if T304 of a secondary cell group expires:
    2> release dedicated preambles provided in rach-ConfigDedicated, if configured;
    2> initiate the SCG failure information procedure as specified in subclause 5.7.3 to report SCG reconfiguration with sync failure, upon which the RRC reconfiguration procedure ends;
1> else if T304 expires when RRCReconfiguration is received via other RAT (HO to NR failure):
    2> reset MAC;
    2> perform the actions defined for this failure case as defined in the specifications applicable for the other RAT.
Editor's note: FFS on how to maintain PDCP COUNT for SRBs and non-DAPS DRBs at fallback to source cell

END OF CHANGES

A.2 Text Proposal for 38.323

Below is a text proposal for the NR PDCP specification (TS 38.323) implemented on top of the running CR discussed in [3]. Changes are added using author "Ericsson".

START OF CHANGES 4.2.2 PDCP entities

The PDCP entities are located in the PDCP sublayer. Several PDCP entities may be defined for a UE. Each PDCP entity is carrying the data of one radio bearer. A PDCP entity is associated either to the control plane or the user plane depending on which radio bearer it is carrying data for.

Figure 1:
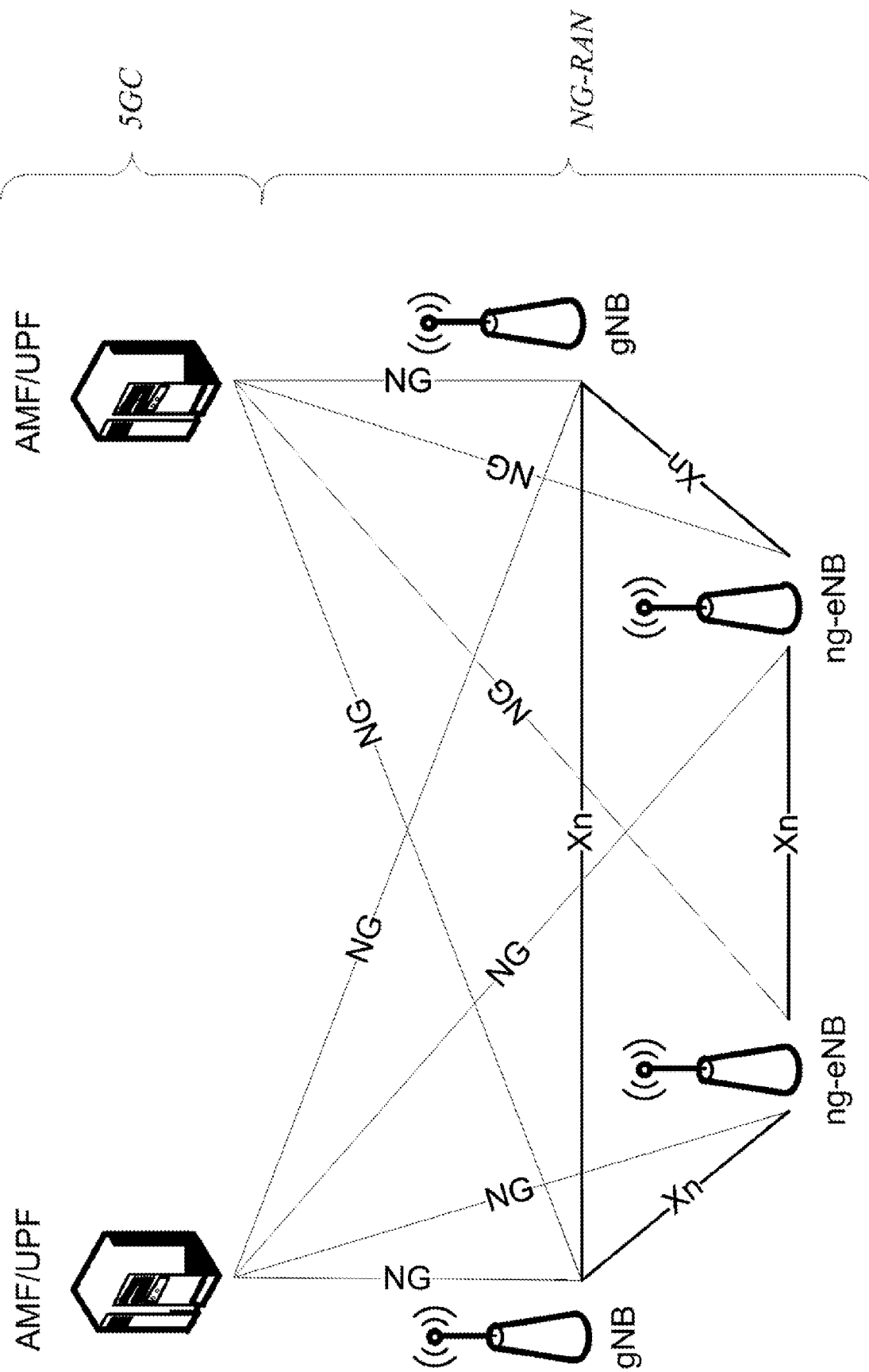
FIG. 1 shows an NG-RAN architecture according to prior art.
Figure 2:
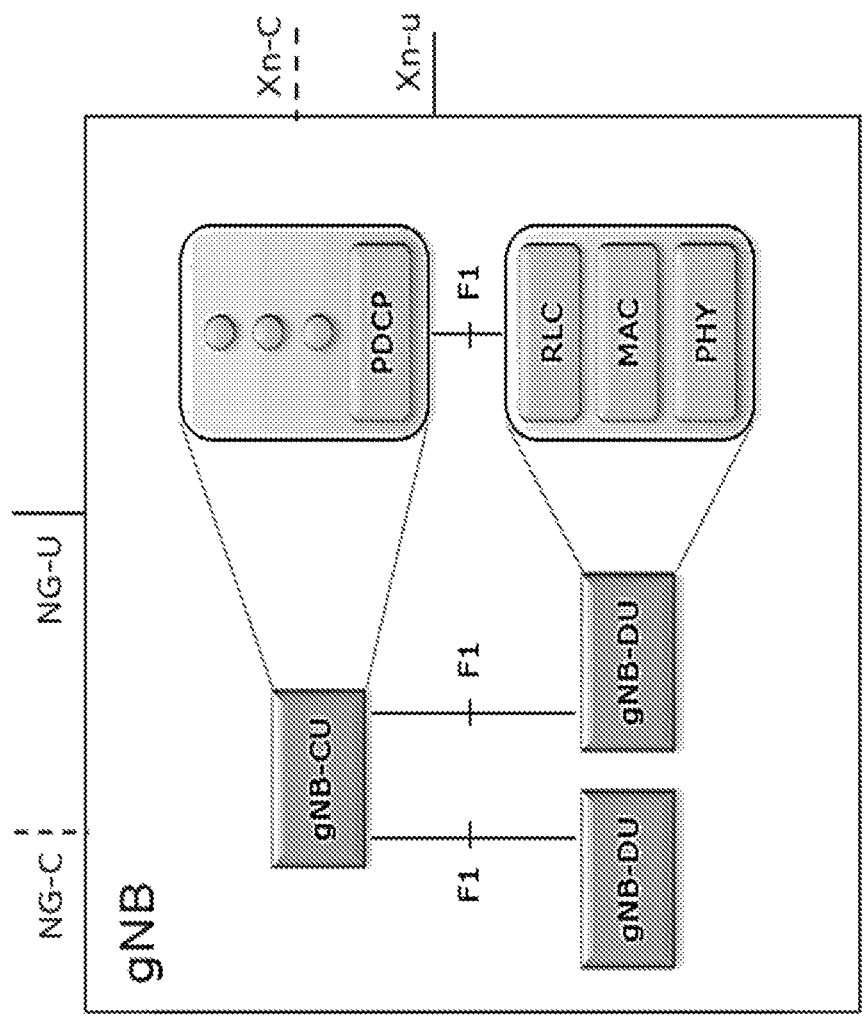
FIG. 2 shows a block diagram depicting an gNB according to prior art.
Figure 3:
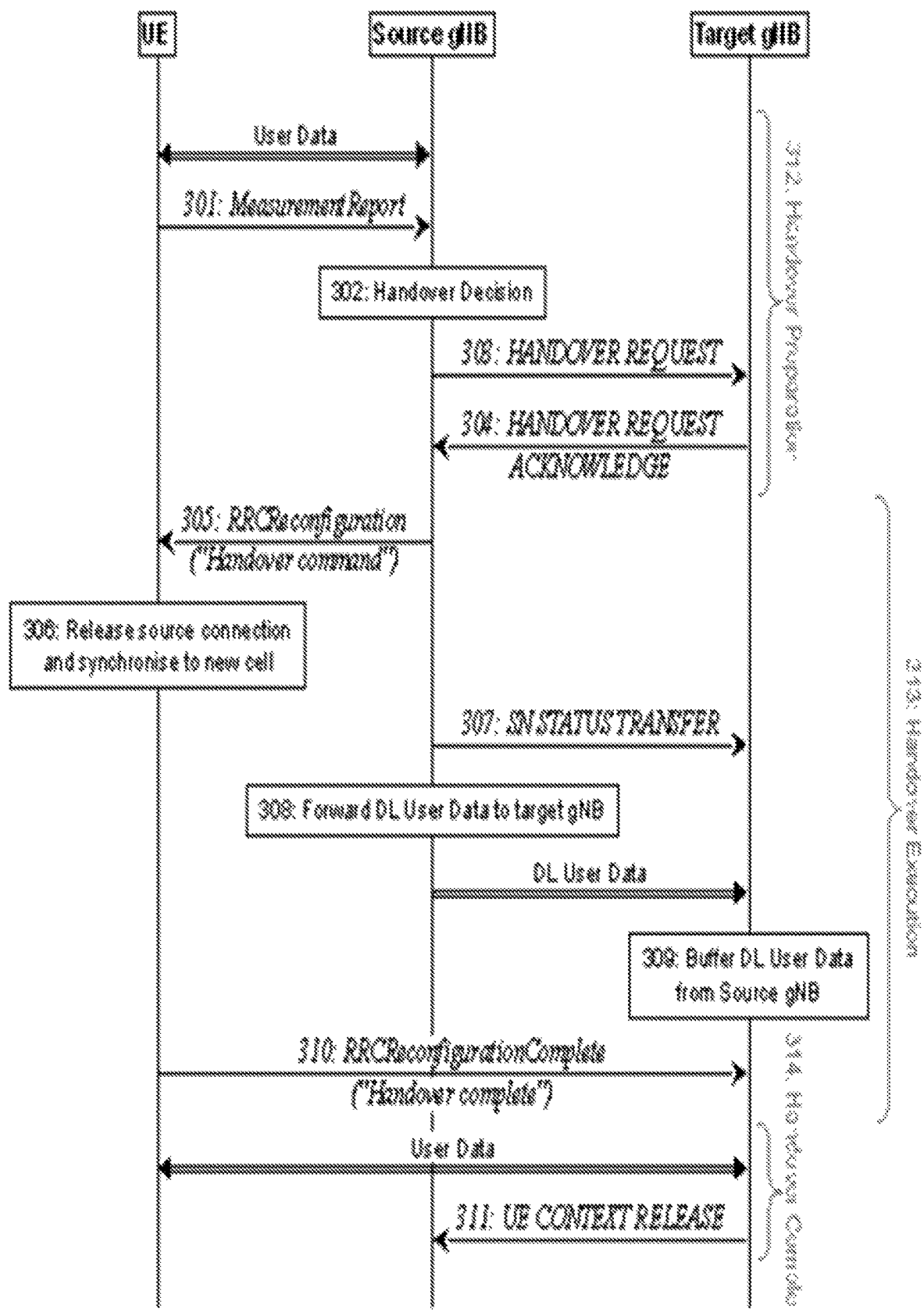
FIG. 3 shows a combined signalling scheme and flow chart according to prior art.
Figure 4:
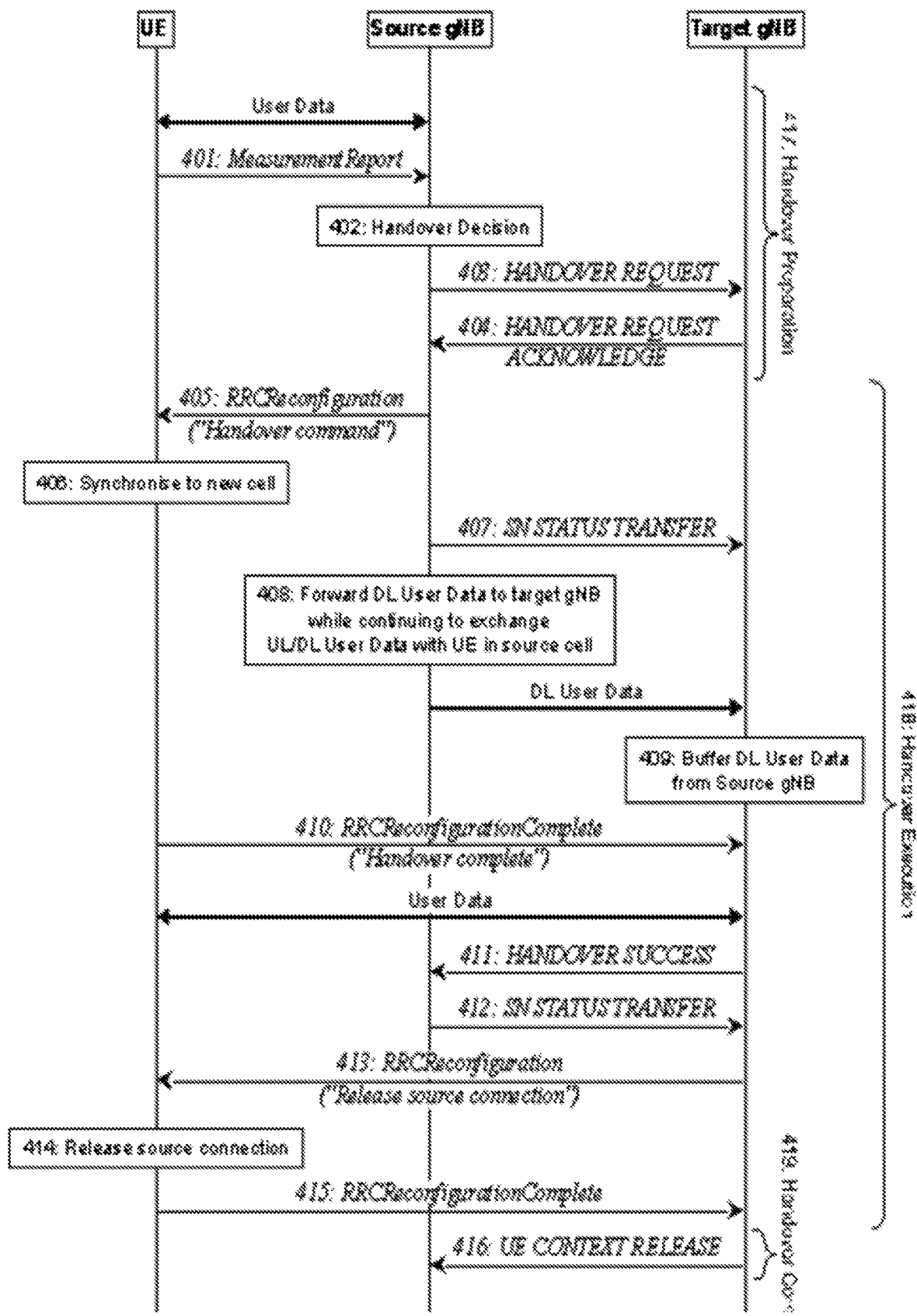
FIG. 4 shows a combined signalling scheme and flow chart according to prior art.
Figure 5:
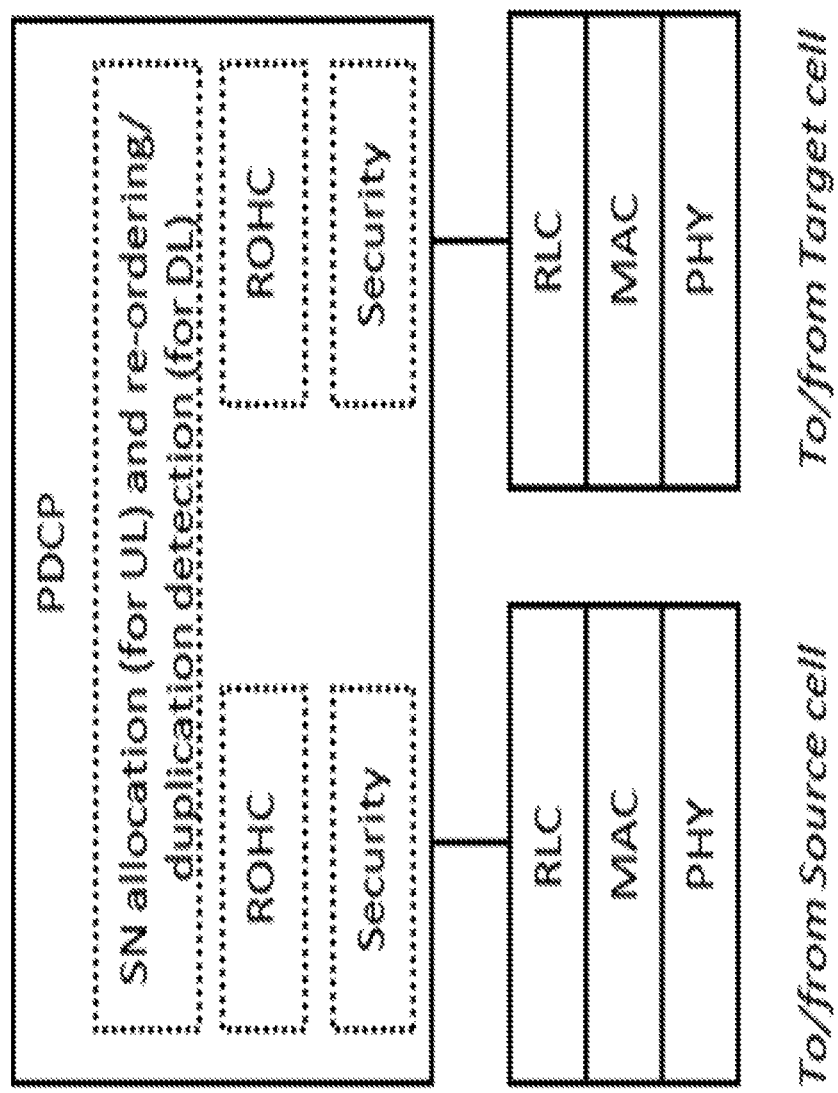
FIG. 5 shows a protocol stack for the DAPS DRBs according to prior art.
Figure 6:
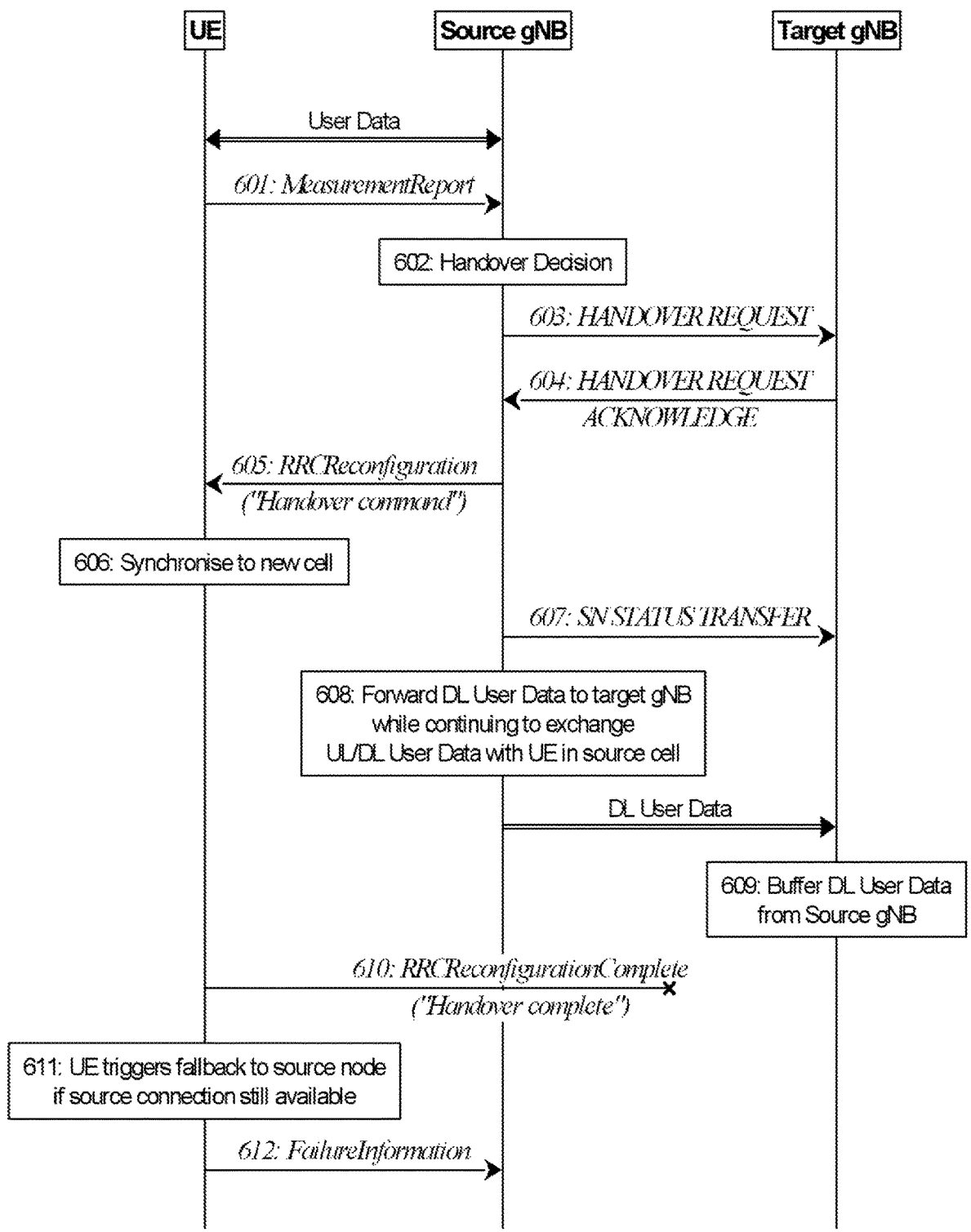
FIG. 6 shows a combined signalling scheme and flow chart according to prior art.
Figure 7:
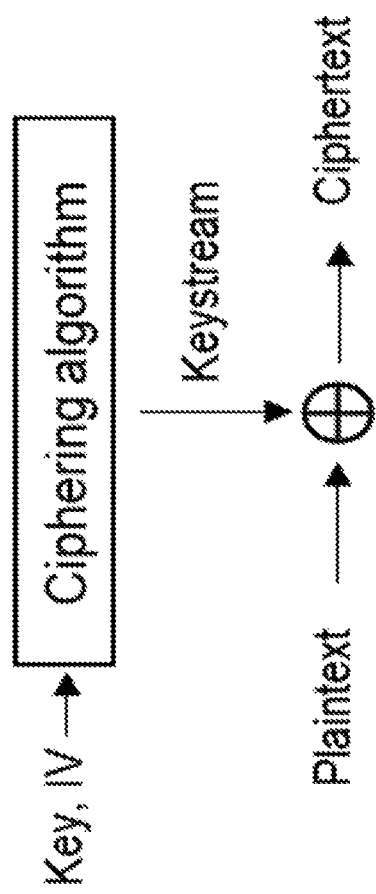
FIG. 7 shows an overview depicting production of a ciphertext according to prior art.
Figure 8:
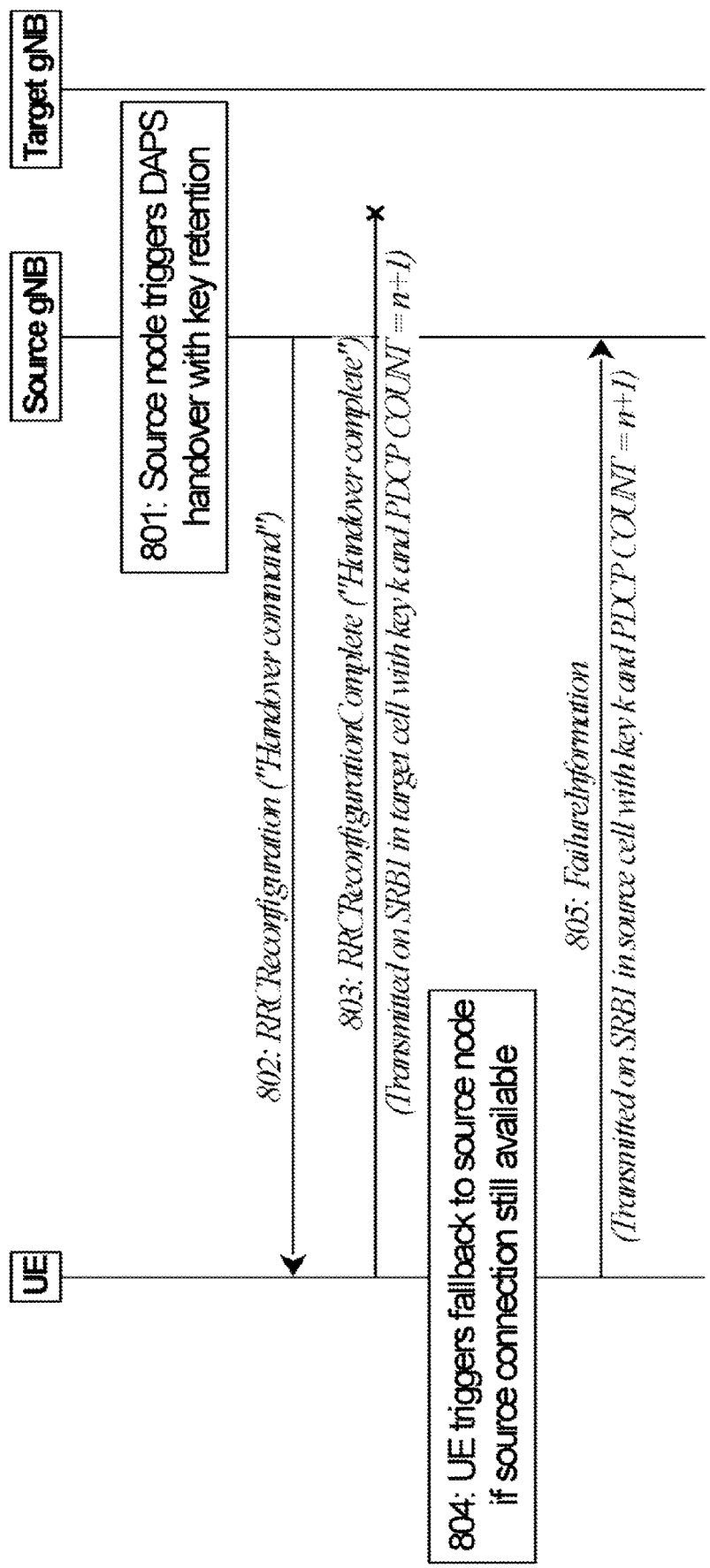
FIG. 8 shows a combined signalling scheme and flow chart according to prior art.
Figure 20:
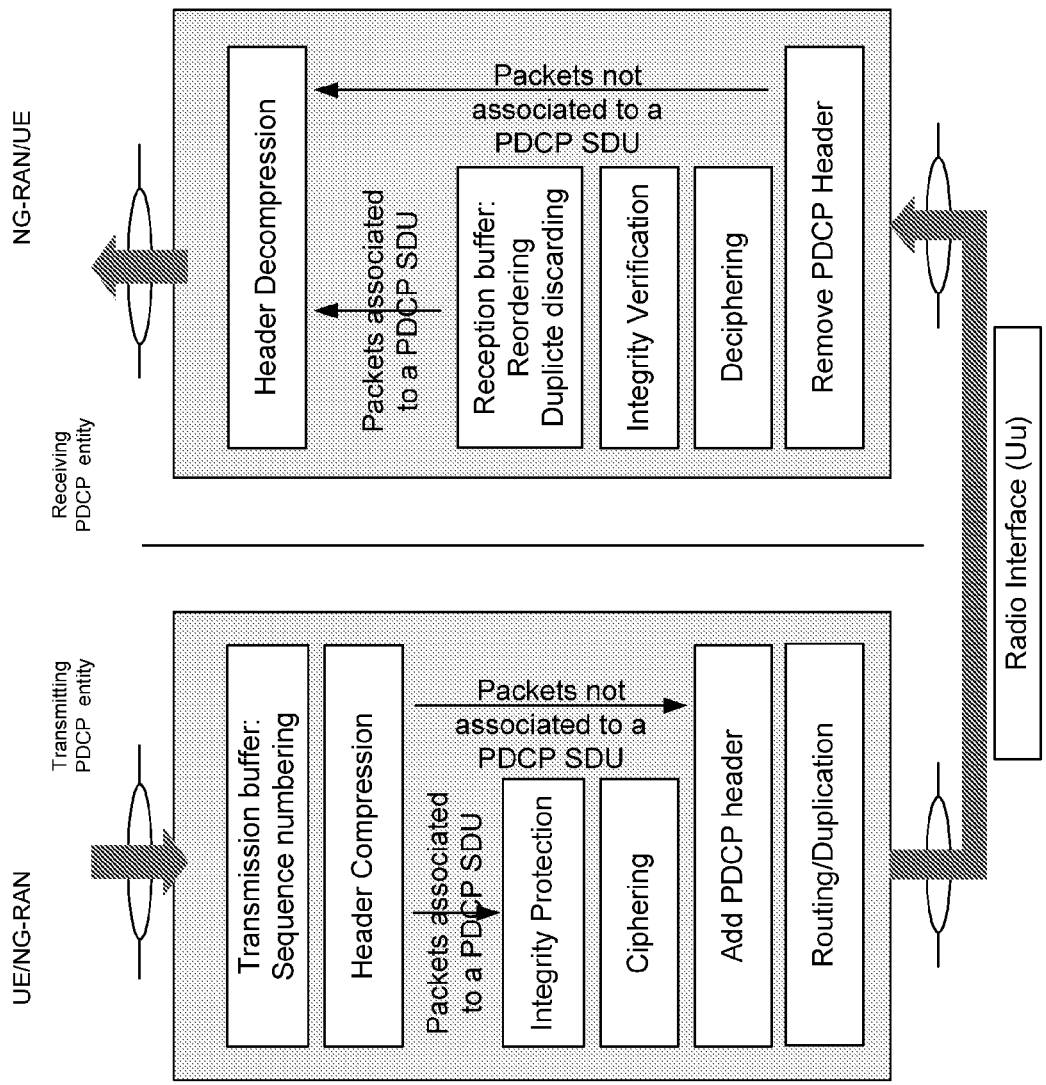
FIG. 20 is a schematic overview depicting PDCP layer, functional view.

Figure 20 or 4.2.2.1 represents the functional view of the PDCP entity for the PDCP sublayer; it should not restrict implementation. The figure is based on the radio interface protocol architecture defined in TS 38.300 [2].

For split bearers and DAPS bearers, routing is performed in the transmitting PDCP entity.

Figure 20 or 4.2.2-1: PDCP layer, functional view

Figure 21:
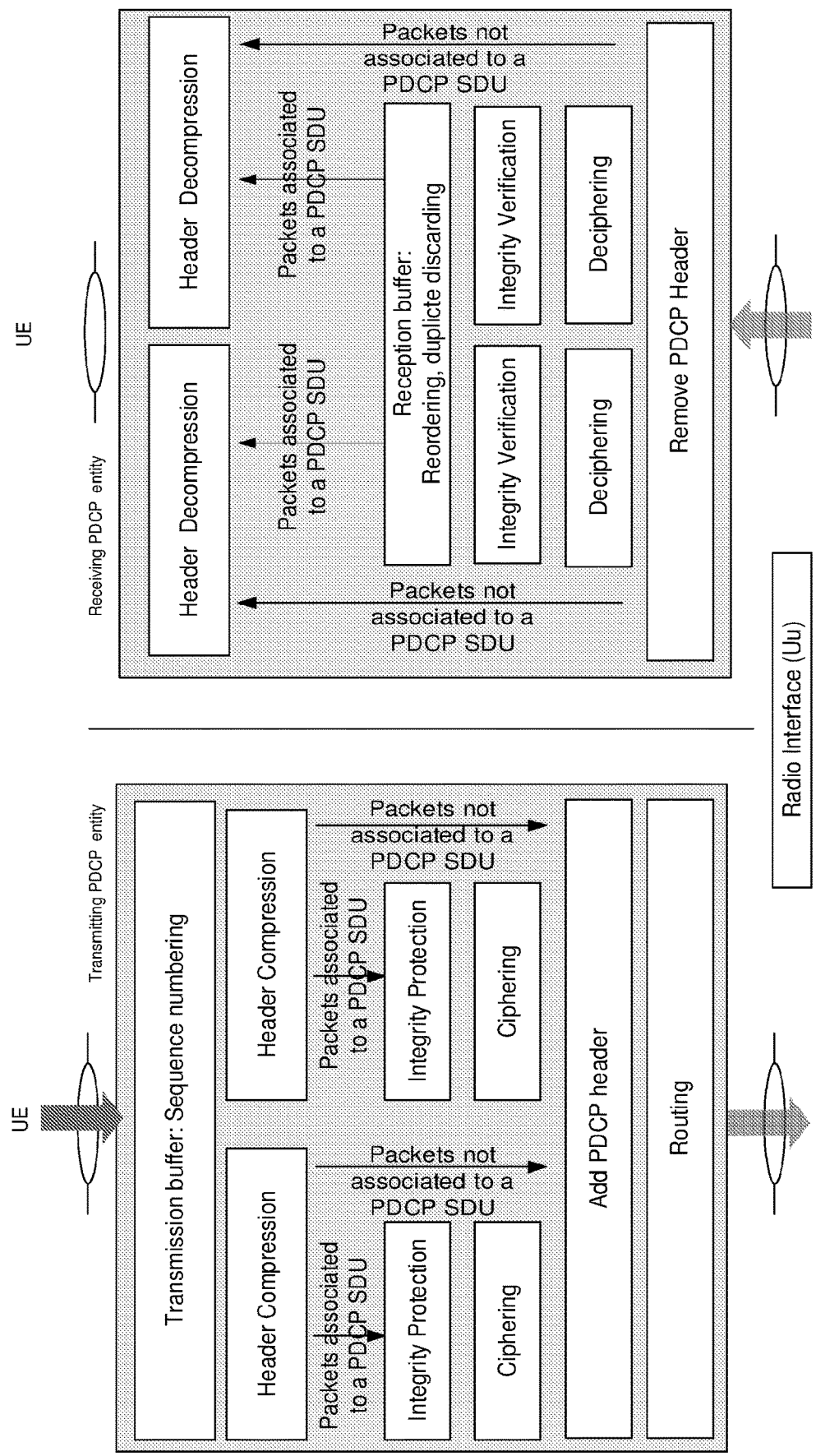
FIG. 21 is a block diagram depicting PDCP layer with DAPS, functional view.

Figure 21. 4.2.2.x represents the functional view of the PDCP entity associated with the DAPS bearer for the PDCP sublayer; it should not restrict implementation. The figure is based on the radio interface protocol architecture defined in TS 38.300 [2].

For DAPS bearers, if the handover is performed with key change, the PDCP entity is configured with two security functions and keys and two header compression protocols. If the DAPS handover is performed without key change the PDCP entity is configured with a single security function and single header compression protocol.

FFS: how to handle duplicate discarding if duplication is enabled

Figure 21 or 4.2.2.x - PDCP layer with DAPS, functional view

NEXT CHANGE 5.x Uplink data switching

For DAPS bearers, when upper layers request uplink data switching, the transmitting PDCP entity shall:

If the security key was updated as part of the handover:
    for AM DRBs, from the first PDCP SDU for which the successful delivery of the corresponding PDCP Data PDU has not been confirmed by the RLC entity associated with the source cell, perform retransmission or transmission of all the PDCP SDUs already associated with PDCP SNs in ascending order of the COUNT values associated to the PDCP SDU prior to uplink data switching to the RLC entity associated with the target cell as specified below:
      perform header compression of the PDCP SDU as specified in the clause 5.7.4;
      perform integrity protection and ciphering of the PDCP SDU using the COUNT value associated with this PDCP SDU as specified in the clause 5.9 and 5.8;
submit the resulting PDCP Data PDU to lower layer, as specified in clause 5.2.1.
for UM DRBs, for all PDCP SDUs which have been processed by PDCP but which have not yet been submitted to lower layers, perform transmission of the PDCP SDUs in ascending order of the COUNT values to the RLC entity associated with the target cell as specified below:
perform header compression of the PDCP SDU as specified in the clause 5.7.4;
perform integrity protection and ciphering of the PDCP SDU using the COUNT value associated with this PDCP SDU as specified in the clause 5.9 and 5.8;
submit the resulting PDCP Data PDU to lower layer, as specified in clause 5.2.1.
else:
perform retransmission of all the PDCP Data PDUs previously submitted to the RLC entity associated with the source cell in ascending order of the associated COUNT values for which the successful delivery has not been confirmed by lower layers, following the data submission procedure in clause 5.2.1.

The invention claimed is:

1. A method performed by a radio network node for handling a communication of a user equipment, UE, in a wireless communication network, the method comprising:
transmitting, to the UE, a handover command for handing over, in a make before break handover, the UE from a source cell to a target cell, wherein a security key for encrypting data communicated between the radio network node and the UE is retained during the make before break handover, and
maintaining, by the radio network node, a sequence number status for reception and/or transmission of a signalling radio bearer of the UE, wherein the maintaining is performed a) during the make before break handover from the source cell to the target cell, b) during a fallback from the target cell to the source cell, and c) when the UE triggers the fallback to the source cell, wherein maintaining the sequence number status comprises maintaining sequential incrementation of a Packet Data Convergence Protocol, PDCP, downlink or uplink, DL/UL, COUNT value for signalling radio bearer one, SRB1, at the make before break handover to the target cell and at fallback to the source cell of the UE.

2. The method according to claim 1, wherein the sequence number status is a count number of a counter.

3. The method according to claim 1, wherein the fallback is triggered in case of a handover failure in the target cell.

4. The method according to claim 1, further comprising:
receiving a handover complete message from the UE on the signalling radio bearer in the target cell using sequence number n+1, where n is the sequence number of the last packet received on the signalling radio bearer in the source cell; and, in case the random access in the target cell fails and the UE triggers fallback to the source cell, maintaining sequence number status for the signalling radio bearer during the fallback of the UE from the target cell to the source cell.

5. The method according to claim 4, further comprising:
receiving a fallback indication message on the signalling radio bearer in the source cell using packet sequence number n+2 or n+1 depending on if the handover complete message was transmitted by the UE in the source cell when the fallback was triggered.

6. A method performed by a user equipment, UE, for handling communication of the UE in a wireless communication network, the method comprising:
receiving, from a radio network node, a handover command for handing over the UE in a make before break handover, from a source cell to a target cell, wherein a security key used for encrypting data communicated between the wireless communication network and the UE, is retained during the make before break handover, and
maintaining, by the UE, a sequence number status for transmission of a signalling radio bearer of the UE, wherein the maintaining is performed a) during the make before break handover from the source cell to the target cell, b) during a fallback from the target cell to the source cell, and c) when the UE triggers the fallback to the source cell, wherein maintaining the sequence number status comprises maintaining sequential incrementation of a Packet Data Convergence Protocol, PDCP, uplink, UL, COUNT value for signalling radio bearer one, SRB1, at the make before break handover to the target cell and at fallback to the source cell of the UE.

7. The method according to claim 6, wherein the handover command instructs the UE to perform a Dual Active Protocol Stack, DAPS, handover from the source cell to the target cell and wherein the security key is retained during the make before break handover; and the sequence number status for a signalling radio bearer during the make before break handover from the source cell to the target cell is maintained; the method further comprising:
transmitting a handover complete message to wireless communication network on the signalling radio bearer in the target cell using sequence number n+1, where n is a sequence number of the last packet transmitted on the signalling radio bearer in the source cell.

8. The method according to claim 7, wherein, in case fallback to the source cell is triggered due to handover failure in the target cell, the packet sequence number status is maintained for the signalling radio bearer during the fallback from the target cell to the source cell, and the method further comprising:
transmitting a fallback indication message on the signalling radio bearer in the source cell using packet sequence number n+2 or n+1 depending on if the handover complete message was transmitted in the target cell when the fallback was triggered.

9. The method according to claim 6, wherein the sequence number status is a count number of a counter.

10. The method according to claim 6, wherein the fallback is triggered in case of a handover failure in the target cell.

11. A radio network node for handling a communication of a user equipment, UE, in a wireless communication network, wherein the radio network node is configured to:
transmit, to the UE, a handover command for handing over, in a make before break handover, the UE from a source cell to a target cell, wherein a security key for encrypting data communicated between the radio network node and the UE is retained during the make before break handover, and maintain, by the radio network node, a sequence number status for reception and/or transmission of a signalling radio bearer of the UE, wherein the maintaining is performed a) during the make before break handover from the source cell to the target cell, b) during and at a fallback from the target cell to the source cell, and c) when the UE triggers the fallback to the source cell, wherein the radio network node is configured to maintain the sequence number status by maintaining sequential incrementation of a Packet Data Convergence Protocol, PDCP, downlink or uplink, DL/UL, COUNT value for signalling radio bearer one, SRB1, at the make before break handover to the target cell and at fallback to the source cell of the UE.

12. The radio network node according to claim 11, wherein the sequence number status is a count number of a counter.

13. The radio network node according to claim 11, wherein the fallback is triggered in case of a handover failure in the target cell.

14. The radio network node according to claim 11, wherein the radio network node is further configured to:
receive a handover complete message from the UE on the signalling radio bearer in the target cell using sequence number n+1, where n is the sequence number of the last packet received on the signalling radio bearer in the source cell; and, in case the random access in the target cell fails and the UE triggers fallback to the source cell, to maintain the sequence number status for the signalling radio bearer during the fallback of the UE from the target cell to the source cell.

15. The radio network node according to claim 11, wherein the radio network node is further configured to:
receive a fallback indication message on the signalling radio bearer in the source cell using packet sequence number n+2 or n+1 depending on if the handover complete message was transmitted by the UE in the source cell when the fallback was triggered.

16. A user equipment, UE, for handling communication of the UE in a wireless communication network, wherein the UE is configured to:
receive, from a radio network node, a handover command for handing over the UE in a make before break handover, from a source cell to a target cell, wherein a security key used for encrypting data communicated between the wireless communication network and the UE, is retained during the make before break handover, and maintain, by the UE, a sequence number status for transmission of a signalling radio bearer of the UE, wherein the maintaining is performed a) during the make before break handover from the source cell to the target cell, b) during a fallback from the target cell to the source cell, and c) when the UE triggers the fallback to the source cell, wherein the UE is configured to maintain the sequence number status by maintaining sequential incrementation of a Packet Data Convergence Protocol, PDCP, uplink, UL, COUNT value for signalling radio bearer one, SRB1, at the make before break handover to the target cell and at fallback to the source cell of the UE.

17. The UE according to claim 16, wherein the handover command instructs the UE to perform a Dual Active Protocol Stack, DAPS, handover from the source cell to the target cell and wherein the security key is retained during the make before break handover; and the sequence number status for a signalling radio bearer during the make before break handover from the source cell to the target cell is maintained; wherein the UE is further configured to:
transmit a handover complete message to the radio network node on the signalling radio bearer in the target cell using sequence number n+1, where n is the sequence number of the last packet transmitted on the signalling radio bearer in the source cell.

18. The UE according to claim 17, wherein, in case fallback to the source cell is triggered due to handover failure in the target cell, the sequence number status is maintained for the signalling radio bearer during the fallback from the target cell to the source cell, and the user equipment is further configured to:
transmit a fallback indication message on the signalling radio bearer in the source cell using sequence number status n+2 or n+1 depending on if the handover complete message was transmitted in the target cell when the fallback was triggered.

19. The UE according to claim 16, wherein the sequence number status is a count number of a counter.

20. The UE according to claim 16, wherein the fallback is triggered in case of a handover failure in the target cell.

21. A non-transitory computer-readable medium comprising instructions, which, when executed on at least one processor, cause the at least one processor to:
transmit, to a User Equipment, UE, a handover command for handing over, in a make before break handover, the UE from a source cell to a target cell, wherein a security key for encrypting data communicated between the radio network node and the UE is retained during the make before break handover, and maintain, by the radio network node, a sequence number status for reception and/or transmission of a signalling radio bearer of the UE, wherein the maintaining is performed a) during the make before break handover from the source cell to the target cell, b) during a fallback from the target cell to the source cell, and c) when the UE triggers the fallback to the source cell, wherein the radio network node is configured to maintain the sequence number status by maintaining sequential incrementation of a Packet Data Convergence Protocol, PDCP, downlink or uplink, DL/UL, COUNT value for signalling radio bearer one, SRB1, at the make before break handover to the target cell and at fallback to the source cell of the UE.

* * * * *